United States Patent [19]

Steinemann

[11] 3,852,261

[45] Dec. 3, 1974

[54] 5-ARYLAZO-6-HYDROXYPYRIDONE-2 DYES BEARING A CATIONIC GROUP IN THE 3-POSITION

[75] Inventor: Willy Steinemann, Basel, Switzerland

[73] Assignee: Sandoz Ltd., Basle, Switzerland

[21] Appl. No.: 87,602

[30] Foreign Application Priority Data

| | | |
|---|---|---|
| Dec. 7, 1969 | Switzerland | 16561/69 |
| Dec. 23, 1969 | Switzerland | 19042/69 |
| Aug. 13, 1970 | Switzerland | 12175/70 |
| Aug. 18, 1970 | Switzerland | 12339/70 |

[52] U.S. Cl. ............... 260/156, 8/41 A, 260/146 R, 260/154, 260/155

[51] Int. Cl. ... C09b 29/36, C09b 31/14, D06p 3/76

[58] Field of Search ......... 260/156, 146 R, 154, 155

[56] References Cited

UNITED STATES PATENTS

| | | | |
|---|---|---|---|
| 2,431,190 | 11/1947 | Morgan | 260/156 X |
| 3,312,681 | 4/1967 | Lewis | 260/156 |
| 3,487,066 | 12/1969 | Ritter et al. | 260/156 |

FOREIGN PATENTS OR APPLICATIONS

| | | | |
|---|---|---|---|
| 1,901,712 | 9/1969 | Germany | 260/156 |

OTHER PUBLICATIONS

Sandoz, Derwent Belgian Patents Report, Number 47/69, pages 2:3 to 2:4 (11-3-1969).

*Primary Examiner*—Floyd D. Higel
*Attorney, Agent, or Firm*—Gerald D. Sharkin; Richard E. Vila; Melvyn M. Kassenoff

[57] ABSTRACT

Azo dyes of the formula

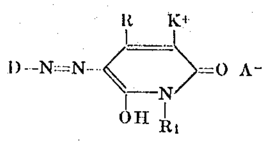

wherein

D is carbocyclic or heterocyclic aryl,

R is hydrogen or an organic radical, $R_1$ is hydrogen, hydrocarbyl, heterocyclyl, amino or substituted amino, $K^{\oplus}$ is substituted ammonium or hydrazinium (including compounds wherein the nitrogen(s) is (are) part of a heterocyclic ring), and $A^{\ominus}$ is an anion.

These azo dyes are useful for the dyeing and printing of fibers (and textiles thereof) of acrylonitrile polymers and copolymers as well as polyamides and polyesters containing acidic groups. They give level dyeings having good fastness to light and water.

35 Claims, No Drawings

5-ARYLAZO-6-HYDROXYPYRIDONE-2 DYES BEARING A CATIONIC GROUP IN THE 3-POSITION

This invention relates to new basic azo dyes free from sulphonic acid groups, which are formed with a dioxypyridine coupling component and in which a cationic nitrogen atom is bound directly on the 3-position of the pyridone. They are highly suitable for the dyeing and printing of polyacrylnitrile and acrylonitrile copolymer fibres and textiles made thereof, including a component of such fibre in blend yarns and fabrics.

These new azo dyes are of the formula

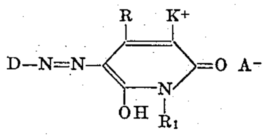

(I), where

D stands for an aromatic carbocyclic or aromatic heterocyclic radical which may be substituted, R for hydrogen or an organic radical, $R_1$ for hydrogen or for a hydrocarbon radical, a heterocyclic radical or an amino group which may be substituted, $A^-$ for an anion equivalent to the dye cation, and $K^+$ for a group of the formula

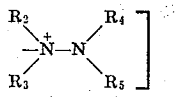

(II),

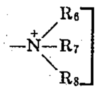

(III),

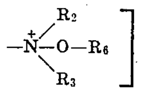

(IV).

In formulae (II), (III) and (IV)

$R_2$ stands for an alkyl or cycloalkyl radical, which may be substituted, or together with $R_3$ and the adjacent N atom for a heterocycle, $R_3$ for an alkyl or cycloalkyl radical, which may be substituted, or together with $R_2$ and the adjacent N atom for a heterocycle, $R_4$ and $R_5$ each stands for a hydrogen atom or for identical or different alkyl or cycloalkyl radicals which may be substituted, $R_6$ and $R_7$ each stands for a hydrocarbon radical which may be substituted, $R_8$ for an alkyl or cycloalkyl radical which may be substituted, and where $R_2$ together with $R_4$ and/or $R_3$ together with $R_5$ and the N atoms adjacent to these substitutents, and/or $R_6$ and $R_7$ or $R_6$, $R_7$ and $R_8$ together with the $N^+$ atom may form heterocycles.

The invention thus comprises azo dyes of the formula

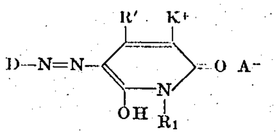

(V), where

R′ represents hydrogen or an alkyl, aryl or heterocyclic radical which may be substituted or a carboxylic acid ester or a carboxylic acid amide radical;

and azo dyes of the formula

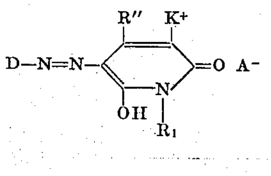

(VI), where

R″ represents an alkyl or aryl radical which may be substituted.

Azo dyes of notably good quality correspond to the formula

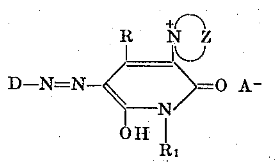

(VII), where

D stands for an aromatic carbocyclic or aromatic heterocyclic radical which may be substituted, R for hydrogen or an organic radical, $R_1$ for hydrogen or a hydrocarbon radical, a heterocyclic radical or an amino group which may be substituted, $A^-$ for an anion equivalent to the dye cation, and Z for a constituent of a multi-membered ring of aromatic character, for example having five or six members, which may bear further hetero atoms and substituents and on which further rings may be condensed, and, more particularly, to the compounds of the formula

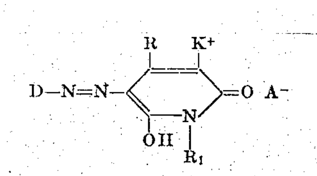

(VIIa), wherein

D is phenyl, naphthyl, anthraquinonyl, 2-thiazolyl, 2-benzothiazolyl or 1,2,4-triazoyl, or a substituted derivative thereof, wherein each substituent of each substituted derivative is independently lower alkyl, lower alkoxy, halo, nitro, cyano, trifluoromethyl, phenyl, lower alkanamidophenyl, phenoxy, chlorophenoxy, benzyloxy, anilino, nitroanilino, dinitroanilino, lower alkanoyl, benzoyl, lower alkylbenzoyl, carbamoyl, dilower alkyl-carbamoyl, phenylcarbamoyl, N-(dilower alkylamino-lower alkyl)carbamoyl, lower alkoxycarbonyl, dilower alkylaminolower alkanoyl, lower alkanamido, dilower alkylaminolower alkanamido, lower alkoxycarbonylamino, benzamido, lower alkylsulfonyl, phenylsulfonyl, chlorophenylsulfonyl, benzylsulfonyl, phenoxysulfonyl, sulfamoyl, lower alkylsulfamoyl, dilower alkylsulfamoyl, phenylsulfamoyl, chlorophenylsulfamoyl, N-phenyl-N-lower alkylsulfamoyl, naphthylsulfamoyl, N-(dilower alkylaminolower alkyl)carbamoylphenyl, phenylazo, nitrophenylazo, chlorophenylazo, chloronitrophenylazo, lower alkylphenylazo, lower alkoxyphenylazo, dilower alkylaminophenylazo, lower alkanamidophenylazo, phenylazophenylazo, phthalimido, 2-oxopyrrolidinyl-1, 2-oxo-1,3-oxazolidinyl-1 or 6-lower alkylbenzothiazolyl-2, and especially phenyl or naphthyl, or a substituted derivative thereof having 1 to 3 substituents, wherein each substituent is independently lower alkyl, lower alkoxy, chloro, bromo, nitro, cyano, phenyl, 4-acetamidophenyl, phenoxy, 4-chlorophenoxy, benzyloxy, anilino, nitroanilino, 2,4-dinitroanilino, acetyl, benzoyl, 4-methylbenzoyl, carbamoyl, dimethylcarbamoyl, phenylcarbamoyl, 3-(N,N-dimethylamino)propylcarbamoyl, lower alkoxycarbonyl, acetamido, N,N-dimethylaminoacetamido, lower alkoxycarbonylamino, benzamido, lower alkylsulfonyl, phenylsulfonyl, 4-chlorophenylsulfonyl, benzylsulfonyl, phenoxysulfonyl, lower alkylsulfamoyl, dilower alkylsulfamoyl, phenylsulfamoyl, 3-chlorophenylsulfamoyl, N-phenyl-N-lower alkylsulfamoyl, naphthylsulfamoyl, phenylazo, nitrophenylazo, 4-chlorophenylazo, tolylazo, lower alkoxyphenylazo, 4-phenylazophenylazo, 2-oxopyrrolidinyl-1, 2-oxo-1,3-oxazolidinyl-1 or phthalimido, $K^+$ is pyridinium, quinolinium, isoquinolinium, quinoxalinium, thiazolium, pyrimidinium, imidazolium, pyrazinium, benzoimidazolium, benzotriazolium, benzothiazolium, traizolium, tetrazolium, thiadiazolium, indazolium or 3-oxopyrazolinium, or a substituted derivative thereof, wherein each substituent of each substituted derivative is independently lower alkyl, lower alkoxy, chloro, bromo, cyano, lower hydroxyalkyl, benzyl, phenyl or dilower alkyl-carbamoyl and especially pyridinium, quinolinium or isoquinolinium, or a substituted derivative thereof, wherein each substituted derivative has 1 to 3 substituents and each substituent of each substituted derivative is independently lower alkyl, methoxy, 2-hydroxyethyl, chloro, bromo, cyano, benzyl or N,N-dimethylcarbamoyl, R is hydrogen, lower alkyl, monosubstituted lower alkyl, phenyl, furyl, pyridyl, lower alkoxycarbonyl or

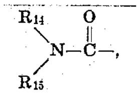

wherein the substituent of monosubstituted lower alkyl is lower alkoxy, lower alkoxycarbonyl, lower alkysulfonyl, cyano, phenoxy, phenyl, dilower alkylcarbamoyl, phenylcarbamoyl or pyrrolidinocarbonyl, and each of $R_{14}$ and $R_{15}$ is independently hydrogen, alkyl of 1 to 6 carbon atoms, monosubstituted lower alkyl, phenyl, tolyl or lower alkoxy, wherein the substituent of monosubstituted lower alkyl is hydroxy, phenyl, lower alkoxycarbonyl, lower alkoxy, cyano, morpholino, piperazino, tetrahydrofuryl or dilower alkylamino, or $R_{14}$ and $R_{15}$ taken together and with the nitrogen to which they are bound are pyrrolidino, piperidino, N'-lower hydroxyalkylpiperazino, hydrazino, N'-lower hydroxyalkylhydrazino or N', N'-dilower hydroxyalkylhydrazino, and R is especially hydrogen, lower alkyl, phenyl, benzyl, lower alkoxymethyl, phenoxymethyl, lower alkoxycarbonyl or

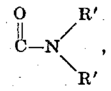

wherein each R' is independently hydrogen, alkyl of 1 to 6 carbon atoms, lower hydroxyalkyl, phenyl, o-tolyl or phenyllower alkyl, $R_1$ is hydrogen, alkyl of 1 to 8 carbon atoms, monosubstituted lower alkyl, phenyl, chlorophenyl, tolyl, N,N-dimethylaminophenyl, anilinophenyl, diphenyl, lower alkylcarbamoyl, amino, dilower alkylamino, lower hydroxyalkylamino, pyrrolidino, morpholino, N-lower alkylpiperazino, pyridyl, tetrahydrofuryl, lower alkylthiazolyl or N-lower alkylpyrrolidinium $^+A^-$, wherein the substituent of monosubstituted lower alkyl is lower alkoxy, hydroxy, dilower alkylamino, lower hydroxyalkylamino, dilower hydroxyalkylamino, cyano, phenyl, lower alkoxycarbonyl, piperazino, N-lower alkylpiperazino, morpholino, pyridinium $^+A^-$ or N,N-dilower alkyl-hydrazinium $^+A^-$, and especially hydrogen, lower alkyl, lower hydroxyalkyl, methoxylower alkyl, phenyl or phenyllower alkyl, and $A^-$ is an anion.

Of the foregoing compounds, those wherein $K^+$ is pyridinium or substituted pyridinium having 1 or 2 substituents, wherein each substituent is independently methyl or ethyl, R is hydrogen, lower alkyl or phenyl, and $R_1$ is hydrogen, lower alkyl, lower hydroxyalkyl or 3methoxypropyl are preferred.

The most preferred compounds are those wherein

D is phenyl or substituted phenyl having 1 to 3 substituents, wherein each substituent is independently methyl, methoxy, chloro, nitro, phenoxy, 4-chlorophenoxy, phenyl or phenylazo, $K^+$ is pyridinium, methylpyridinium or dimethylpyridinium, R is methyl or phenyl, and $R_1$ is hydrogen, methyl, 1-hydroxypropyl-2, 2-hydroxyethyl or 3-methoxypropyl.

$A^-$ is preferably $Cl^-$.

The invention comprises in particular azo dyes as defined in the following.

Azo dyes of the formulae

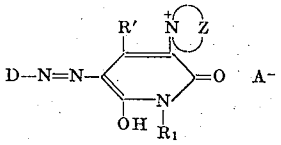

(VIII), where R′ represents hydrogen, an alkyl, aryl or heterocyclic radical or a carboxylic acid ester or a carbocyclic acid amide radical and $R_1$, D, Z and $A^-$ have the meanings assigned to them in the foregoing;

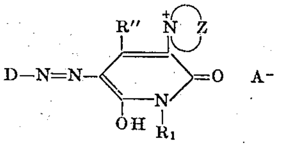

(IX), where R″ represents an alkyl or aryl radical which may be substituted and D, $R_1$, Z and $A^-$ have the aforestated meanings;

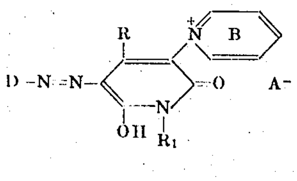

(X), where the pyridinium ring B may be unsubstituted or substituted; and D, R, $R_1$ and $A^-$ have the aforestated meanings;

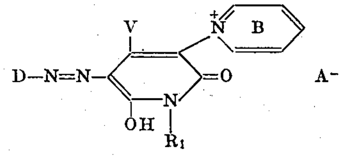

(XI), where V represents R′ or R″ and D, $R_1$, B and $A^-$ have the aforestated meanings;

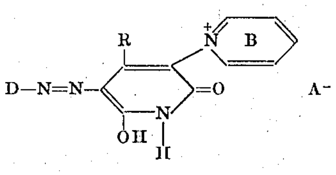

(XII), and

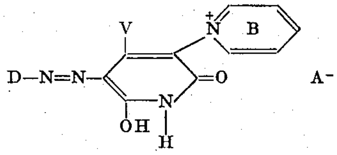

(XIII).

The new azo dyes of formulae (I) and (VII) can be produced by coupling the diazo compound of an amine of the formula $$D - NH_2 \quad (XIV)$$

with a coupling component of the formula

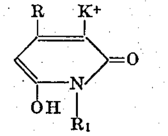

(XV)

or

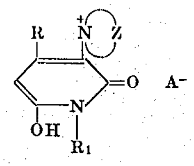

(XVI).

Disazo or polyazo dyes can be produced as desired.

Dyes of the formula

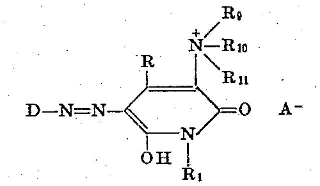

(XVII), where $R_9$ and $R_{10}$ each represents a hydrocarbon radical which may be substituted, $R_{11}$ an alkyl or cycloalkyl radical which may be substituted and where $R_9$ and $R_{11}$ together with the $N^+$ atom may form a saturated or partially saturated heterocycle, can be obtained by quaternization of an azo compound of the formula

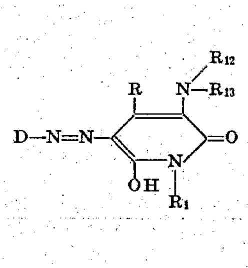

(XVIII)

where $R_{12}$ and $R_{13}$ each represents a hydrogen atom or a hydrocarbon radical which may be substituted, or which, jointly with the N atom bound thereto, may form a saturated or partially saturated heterocycle.

An alternative method of producing these new dyes is to couple the diazo compound of an amine of formula (XIV) with an acylacetic acid ester, e.g. acetoacetic acid methyl ester, by one of the known methods, and to react the resulting compound with a salt of an acetic amide bearing a cationic group, e.g. pyridinium acetamide chloride, in the presence of a catalyst in a solvent, preferably an organic solvent, such as methanol.

The dyes of formula (I) and formula (III) can also be produced by the oxidative coupling or coupling of N-nitroso compounds of heterocyclic amines with a compound of formula (XV) or (XVI).

The new dyes are eminently suitable for dyeing and printing textiles which consist of polyacrylonitrile or acrylonitrile copolymer fibres or which contain a component of one of these fibres. They are suitable further for dyeing and printing synthetic polyamide and synthetic polyester fibres modified by the introduction of acid groups. Polyamides of this type are described, for example, in Belgian Patent No. 706,104, while corresponding polyesters are disclosed, e.g. in U.S. Pat. Nos. 3,018,277 and 3,379,723.

The dyes are normally applied from an aqueous medium of neutral or acid reaction at temperatures in the range of 60°C to 100°C or at higher temperatures under static pressure. They give level dyeings without the assistance of retarders. As stated, they are well suitable for dyeing the polyacrylonitrile or acrylonitrile copolymer fibre component of blend yarns and fabrics.

The dyes of this disclosure which have good solubility in organic solvents are suitable for the coloration of natural materials and natural resins in the mass, for the coloration of plastics materials and the dyeing of leather and paper.

On polyacrylonitrile and acrylonitrile copolymer fibres in particular, but also on other substrates, the dyes produce level dyeings showing good light and wet fastness. Notable features of these dyes are the high tinctorial strength and excellent covering power.

It has been found that mixtures of two or more of the new dyes and mixtures of these with other cationic dyes can be employed advantageously; the dyes are thus suitable for combination dyeing and cause no catalytic fading. The term "catalytic fading" refers to the type of fading shown by most yellow and greenish to reddish yellow dyes when dyed in combination with other dyes, in particular blue, violet or red dyes. It is due to interaction between the dyes and is more pronounced than the fading shown by dyeings of the single dyes.

The dyes of formula (I) give dyeings with good fastness to washing, perspiration, sublimation, pleating, decatizing, pressing, steaming, water, sea water, dry cleaning, cross dyeing and solvents. They are readily soluble, especially in water, show good compatibility with salts, good pH-stability and withstand prolonged treatment at boiling temperatures. The dyes reserve natural and synthetic polyamide fibres, provided the latter have not been modified by the introduction of acid groups.

It can be assumed that the dyes with a dihydroxypyridone radical are present in a tautomeric state, which can be represented by the formula

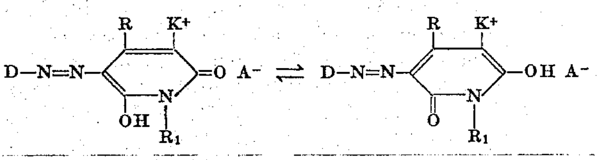

In the dyes of formula (I) the anion $A^-$ can be replaced by another anion, e.g. with the aid of an ion exchanger or by reaction with salts or acids, if necessary in more than one step, for example via the hydroxide or the bicarbonate. The anion $A^-$ may be an organic or inorganic ion, for example the ion of a halogen, such as chloride, bromide or iodide, or a sulphate, disulphate, methylsulphate, aminosulphonate, perchlorate, carbonate, bicarbonate, phosphate, phosphorus molybdate, phosphorus tungstate, phosphorous tungstic molybdate, arylsulphonate, such as benzenesulphonate, 4-methylbenzenesulphonate, oxalate, maleinate, acetate, propionate, lactate, succinate, chloroacetate, tartrate, methanesulfonate or benzoate ion, or complex anions, such as that of zinc chloride double salts.

The meaning of "halogen" may be bromine, fluorine or iodine, but it is preferably chlorine. Examples of organic radicals are hydrocarbon radicals including substituted or unsubstituted alkyl and cycloalkyl radicals, such as cyclohexyl and alkylcyclohexyl radicals, and substituted or unsubstituted aryl radicals, such as phenyl radicals.

The alkyl radicals may be straight or branched, may be interrupted by hetero atoms and usually bear 1 to 12, 1 to 6 or preferably 1 to 4 carbon atoms. If these radicals are substituted they contain, in particular, halogen atoms, hydroxyl or cyano groups or aryl radicals, such as phenyl radicals; in such cases alkyl stands for an aralkyl radical, e.g. a benzyl radical. The alkoxy radicals may contain 1 to 6 or preferably 1 to 3 carbon atoms. All the radicals of aromatic character, especially the aromatic carbocyclic and aromatic heterocyclic ones, such as aryl radicals, e.g. phenyl, naphthyl, tetrahydronaphthyl, pyridyl, quinolyl and tetrahydroquinolyl radicals, may bear substitutents, especially non-water-solubilizing substituents, such as halogen atoms, nitro, amino, cyano, thiocyano, hydroxyl, alkyl, alkoxy, trifluoroalkyl, trichloro-alkyl, phenyl, phenoxy, alkylamino, dialkylamino, phenylamino, acyl, acyloxy, acylamino, e.g. acetylamino, benzoylamino, alkylsulphonyl, arylsulphonyl, sulphonic acid amide, sulphonic acid alkylamide, sulphonic acid dialkylamide, sulphonic acid arylamide groups, arylazo, e.g. phenylazo, diphenylazo, or the —COOH group.

The radicals $R_2$ and $R_3$, together with the adjacent $N^+$ atom, may form a heterocycle, e.g. a pyrrolidine, piperazine, morpholine, aziridine or piperidine ring. The radical $R_2$, jointly with $R_4$ and/or the $R_3$ radical jointly with $R_5$ and the $N^+$ atoms adjacent to these substituents, may form a saturated or unsaturated, preferably five- or six-membered heterocycle such as pyrazolidine, pyridazine or pyrazoline ring, e.g. trimethylene pyrazolidine or tetramethylpyrazoline.

The radicals $R_6$ and $R_7$, $R_9$ and $R_{10}$, and similarly the radicals $R_{12}$ and $R_{13}$ or $R_{14}$ and $R_{15}$, together with the adjacent N atom, may form a saturated or partially saturated heterocycle, for example a pyrrolidine, piperidine, morpholine, aziridine or piperazine ring.

The radicals $R_6$, $R_7$ and $R_8$, together with the adjacent $N^+$ atom, may form a heterocycle, e.g. a group of the formula

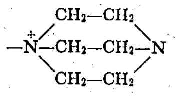

or may stand for pyridinium ring.

The heterocyclic radicals R' and $R_1$ and the groups of formula

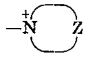

may stand for the radicals of saturated, partly saturated or unsaturated multi-membered rings, preferably five- or six-membered rings, which may be substituted and on which further cycloaliphatic, heterocyclic or aromatic rings may be condensed. The group of the formula

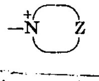

may represent a pyridine, quinoline, isoquinoline, piperidine, pyrrolidine, morpholine, aziridine, piperazine, tetrahydroquinoline, pyrazole, triazole, pyridazine, imidazole, pyrimidine, thiazole, benzothiazole, thiadiazole, indazole, pyrrole, indole, indolenine, oxazole, isoxazole or tetrazole ring, and $R_1$, may represent a piperidine, pyrrolidine, morpholine, aziridine, piperazine, tetrahydroquinoline, pyridazine, pyrrole or indole ring.

The dyes of formulae (I) and (VII) may bear, in addition to the cationic group $K^+$ or

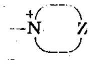

further cationic groups, e.g., in the radical D and/or in the radical R or $R_1$. These cationic groups may be hydrazinium, ammonium, cycloimmonium or sulphonium groups. The dyes of these two formulae may also contain protonizable groups, e.g., in the radicals $R_1$ and/or R; the term "protonizable groups" refers to radicals containing nitrogen which add on a proton in acid, preferably mineral acid medium, to form salts. These are defined in Belgian Patent No. 733,186.

An example of an amino group which may bear substituents is a primary, secondary or tertiary amino group, such as that of the formula

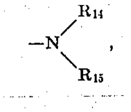

where $R_{14}$ and $R_{15}$ each represent hydrogen or a hydrocarbon radical or which, together with the N atom, may form a heterocycle, for example a saturated or partly saturated heterocycle.

The carboxylic acid ester radicals may be groups of the formula —COOX', where X' represents a substituted or unsubstituted hydrocarbon radical.

The carboxylic acid amide radicals stand primarily for a group of the formula

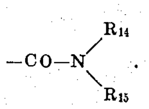

The —COOX' and

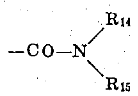

radicals are, as defined, bound directly on the pyridone ring.

Normal methods can be employed for coupling diazotized amines of formula (XIV) with a coupling component of formula (XV) or (XVI), e.g. diazotization with sodium nitrite in hydrochloric acid medium and coupling in aqueous-acid or aqueous-alkaline medium at temperatures of about −10°C to room temperature. Quaternation can likewise be carried out by known methods, e.g., in an inert solvent, in aqueous suspension with the addition of solvent, or without solvent in an excess of the quaternating agent, if necessary at elevated temperatures and in buffered medium. It is advantageous to use organic acids, if necessary in conjunction with a basic compound.

Examples of quaternating agents are alkyl halides such as methyl and ethyl chloride, bromide and iodide, alkylsulphates, such as dimethyl sulphate; benzyl choride; acrylic amides/hydrochloride, e.g. $CH_2{=}CH{-}CO{-}NH_2/HCl$; chloroacetic acid alkylester; β-chloropropionic amide; epoxides, such as ethylene oxide, propylene oxide, epichlorhydrin. The suitable quaternating agents include compounds of formula $R_{11}$—A.

The coupling components of formulae (XV) and (XVI) can be produced by reacting a salt of an acetic amide bearing a cationic group, e.g. pyridinium acetamide chloride, with an acylacetic acid ester, e.g. acetoacetic acid methyl ester, in a solvent, preferably organic, such as methanol, and in the presence of a catalyst.

Suitable catalysts are, for example, amines, such as dimethyl amine, diethyl amine, piperidine, morpholine, and ammonium acetate, sodium acetate, potash, sodium carbonate and sodium hydroxide. The dye of the formula

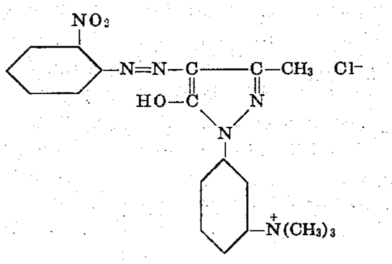

(a)

is disclosed in German published Pat. application 1,040,152 for the dyeing of polyacrylonitrile fibres, on which it gives yellow shades. It is surprising that the dyes of formulae (I) and (VII), which are also of yellow shade, dye polyacrylonitrile fibres to considerably greater depth. Both in dye (a) and in the dyes of formulae (I) and (VII) the cationic group is bound directly to a ring.

The intermediate compounds of formulae (XV) and (XVI) are suitable for varied purposes. They can be employed as optical brighteners and insecticides and as intermediates for the production of optical brighteners and insecticides.

In the following Examples the parts and percentages are by weight and the temperatures in degrees centigrade.

EXAMPLE 1

9.3 Parts of aminobenzene are diazotized by the normal method in 150 parts of 8 percent hydrochloric acid. A solution of 25 parts of 2-keto-3-pyridinium chloride-4-methyl-6-hydroxy-1,2-dihydropyridine (prepared by reacting pyridinium chloride acetamide with acetoacetic methyl ester in methanolic sodium hydroxide solution) in 150 parts of water is added dropwise at 0°. At the same time 100 parts of a 12.5 percent aqueous sodium acetate solution are added. After completion of coupling, the temperature is increased to 40°, hydrochloric acid is added to adjust to a mineral acid reaction, and the new dye, which is present in the form of the chloride, is salted out and filtered. It can be purified by recrystallization. After drying and grinding, it is obtained as a water-soluble powder which dyes polyacrylonitrile and acrylonitrile copolymer fibres in yellow shades of outstanding light fastness.

DYEING METHOD

A mixture of 1 part of the dye of Example 1 and 80 parts of dextrin is ground in a ball mill for 48 hours. One part of the resulting dyeing preparation is pasted with 1 part of 40 percent acetic acid, 400 parts of distilled water at 60° are run into the paste with constant stirring, and the suspension is boiled for a short time. The solution formed is diluted with 7,600 parts of distilled water, with the subsequent addition of 2 parts of glacial acetic acid. Into this dyebath 100 parts of a polyacrylonitrile fabric are entered at 60°, after pretreatment for 10–15 minutes at 60° in a bath of 8000 parts of water and 2 parts of glacial acetic acid. The dyebath is raised to 100° in 30 minutes and the fabric dyed for 1 hour at this temperature, with subsequent rinsing. A level yellow dyeing of excellent light and very good wet fastness is obtained.

EXAMPLE 2

14.15 Parts of 1-amino-3-chloro-4-methylbenzene are diazotized with 6.9 parts of sodium nitrite. A solution of 25 parts of 2-keto-3-pyridinium chloride-4-methyl-6-hydroxy-1,2-dihydropyridine (prepared by reacting pyridinium chloride acetamide with acetoacetic methyl ester in iso-propanolic sodium hydroxide solution) in 200 parts of water is dropped into the ice-cold diazo solution. 15 Parts of crystallized sodium acetate are gradually added to the coupling solution. Stirring is continued at 0°–20° and then at 40°, with the addition of hydrochloric acid to obtain a mineral acid reaction. The new dye is salted out by adding common salt and purified by recrystallization. A yellow water-soluble powder is obtained which gives level, fast-to-light yellow dyeings on polyacrylonitrile fibres.

Dyes of comparably good quality are obtained when the 14.15 parts of 1-amino-3-chloro-4-methylbenzene employed in the foregoing Example are replaced by an equivalent amount of one of the following amines and the procedure of this Example followed:

1-aminobenzene
1-amino-2-chlorobenzene
1-amino-3-chlorobenzene
1-amino-2,6-dichlorobenzene
1-amino-2,3-dichlorobenzene
1-amino-2,5-dichlorobenzene
1-amino-2,4-dichlorobenzene
1-amino-3,4-dichlorobenzene
1-amino-3,5-dichlorobenzene
1-amino-4-acetaminobenzene
1-amino-2-chloro-4-acetaminobenzene
1-amino-4-benzoylaminobenzene
1-amino-4-phenylbenzene
4-amino-1,1'-diphenylether
4-amino-4'-chloro-1,1'-diphenylether
2-amino-4'-chloro-1,1'-diphenylether
2-amino-1,1'-diphenylether
1-amino-2-chloro-4-methylsulphonylbenzene
1-amino-4-methylsulphonylbenzene
1-aminobenzene-3-sulphonic acid phenylester
1-aminobenzene-4-sulphonic acid phenylester
1-amino-2-chlorobenzene-5-sulphonic acid phenylester 1-amino-2-methylbenzene-5-sulphonic acid phenylester
1-amino-2,6-dichlorobenzene-4-sulphonic acid phenylester
1-amino-3-trifluoromethylbenzene
1-amino-3,5-di-(trifluoromethyl)-benzene
1-amino-2-(trifluoromethyl)-4-chlorobenzene
1-amino-4-carbethoxyaminobenzene
1-amino-2,5-dimethoxy-4-carbethoxyaminobenzene
1-aminonaphthalene
1-aminonaphthalene-4-sulphonic acid dimethylamide
4-aminophenyl-phthalimide
2-aminoterephthalic acid-dimethylester
4-aminobenzophenone
4-amino-4'-methylbenzophenone
1-amino-4-acetylbenzene
4-amino-2',4'-dinitrodiphenylamine
4-amino-4'-nitrodiphenylamine
4-amino-2'-nitrodiphenylamine
2-aminothiazole
2-amino-5-methoxybenzothiazole
1-amino-2-methylbenzene
1-amino-3-methylbenzene
1-amino-4-methylbenzene
1-amino-2,5-dimethylbenzene
1-amino-2-methyl-3-chlorobenzene
1-amino-2-methyl-6-chlorobenzene
1-amino-2-methyl-5-chlorobenzene
1-amino-2-chloro-4-methylbenzene
1-amino-3-chloro-4-methylbenzene
1-amino-3,6-dichloro-4-methylsulfamoylbenzene
1-amino-2-chloro-4-nitrobenzene
1-amino-2-bromo-4-nitrobenzene
1-amino-2,5-dichloro-4-methoxybenzene
1-amino-2-methoxybenzene
1-amino-4-methoxybenzene
1-amino-2,5-dimethylbenzene
1-amino-2-methyl-3-chlorobenzene
1-amino-2-methyl-6-chlorobenzene
1-amino-2-methyl-5-chlorobenzene
1-amino-2-chloro-4-methylbenzene
1-amino-3-chloro-4-methylbenzene
1-amino-3,6-dichloro-4-dimethylsufamoylbenzene
1-amino-2-chloro-4-nitrobenzene
1-amino-2-bromo-4-nitrobenzene
1-amino-2,5-dichloro-4-methoxybenzene
1-amino-2-methoxybenzene
1-amino-4-methoxybenzene
1-amino-3-chloro-4-methoxybenzene
1-amino-2-ethoxybenzene
1-amino-4-ethoxybenzene
1-amino-4-benzoxybenzene
1-aminophenylacetamide
1-aminophenylacetanilide
1-amino-2-cyanobenzene
1-amino-4-cyanobenzene
1-amino-3-cyanobenzene
1-amino-2-cyano-4-nitrobenzene
1-amino-2-cyano-4-nitro-6-bromobenzene
1-amino-2-nitro-4-methylbenzene
1-amino-2-nitro-4-chlorobenzene
1-amino-2,5-dimethoxy-4-chlorobenzene
1-amino-2,5-dimethoxy-4-bromobenzene
1-amino-2,5-dimethoxybenzene
1-amino-2,5-diethoxybenzene
1-amino-2,5-dimethoxy-4-acetaminobenzene
1-amino-2,5-dimethoxy-4-benzoylaminobenzene
1-amino-2,5-diethoxy-4-benzoylaminobenzene
1-aminobenzene-4-sulphonic acid methylamide
1-aminobenzene-4-sulphonic acid dimethylamide
1-aminobenzene-4-sulphonic acid phenylamide
1-aminobenzene-4-sulphonic acid -2'-chlorophenylamide
1-aminobenzene-3-sulphonic acid phenylamide
1-aminobenzene-2-sulphonic acid-N-ethylphenylamide
1-aminobenzene-2-methyl-5-sulphonamide
1-amino-4-methylbenzene-3-sulphonic acid N-ethylphenylamide
1-amino-4-methylbenzene-3-sulphonic acid phenylamide
1-amino-2,5-dichlorobenzene-4-sulphonic acid phenylamide
1-amino-3-nitrobenzene
1-amino-4-nitrobenzene
1-amino-2-methoxy-4-nitrobenzene
1-amino-2,5-dimethoxy-4-nitrobenzene
1-amino-2,5-dinitrobenzene
1-aminobenzene-4-carboxylic acid methylester
1-aminobenzene-4-carboxylic acid ethylester
1-amino-2-methylbenzene-4-carboxylic acid ethylester
1-amino-2-methylbenzene-4-carboxylic acid phenylamide
1-aminobenzene-4-carboxylic acid phenylamide
1-aminobenzene-4-carboxylic acid dimethylamide
1-aminobenzene-4-carboxylic acid amide
1-aminobenzene-2-carboxylic acid amide
1-amino-4-chlorobenzene-2-carboxylic acid methylester
1-aminobenzene-2-carboxylic acid methylester
1-aminobenzene-3-carboxylic acid methylester
1-aminobenzene-3-carboxylic acid phenylamide
1-amino-3-nitro-4-methylbenzene
1-amino-2-nitro-4-methoxybenzene
2-aminobenzothiazole-6-sulphonamide
2-aminoanthraquinone
4-aminoazobenzene
1-amino-3-acetaminobenzene
1-aminobenzene-4-sulphonic acid naphthyl-(1)-amide
2-(4'-amino)-phenyl-6-methylbenzothiazole
3-amino-1,2,4-triazole
1-amino-2-nitro-4-methylbenzene
1-amino-2,4,6-trichlorobenzene
1-amino-4-(ω-dimethylamino)-acetylbenzene
1-amino-2-nitro-4-acetaminobenzene
4-amino-2-methyl-5-methoxyazobenzene
4-amino-2,5-dimethoxyazobenzene
4-amino-4'-nitroazobenzene
4-amino-4'-acetaminoazobenzene
4-amino-4'-dimethylaminoazobenzene
1-amino-4'-phenylazonaphthalene
1-amino-2-ethoxy-4'-phenylazonaphthalene
4-amino-3'-methylazobenzene
4-amino-4'-methoxyazobenzene

EXAMPLE 3

14.15 Parts of 1-amino-2-methyl-3-chlorobenzene are diazotized in the known way with 6.9 parts of sodium nitrite. 28 Parts of 1,2',4-trimethyl-2-keto-3-pyridinium chloride-6-hydroxy-1,2-dihydropyridine (prepared by condensing acetoacetic ester with 2'- methyl pyridinium chloride acetic acid methyl amide in ethanol in the presence of potassium hydroxide) are dissolved in 200 parts of water and the solution dropped into the ice-cold diazo solution. Sodium acetate is added and the reaction solution raised to 50°. The dye formed is precipitated from solution with sodium chloride. It is obtained as a yellow water-soluble powder which gives fast greenish yellow dyeings on polyacrylonitrile and acrylonitrile copolymer fibres.

Comparably good dyes are obtained by practising the procedure of this Example with the 14.15 parts of 1-amino-2-methyl-3-chlorobenzene replaced by the equivalent amount of one of the amines listed after Example 2. Other equally good dyes result when the 28 parts of 1,2',4-trimethyl-2-keto-3-pyridinium chloride-6-hydroxy-1,2-dihydropyridine used in this Example are replaced by the equivalent amount of 1-(3''-methoxy)-n-propyl-2-keto-3-(2'-chloro)-pyridinium chloride-4-methyl-6-hydroxy-1,2-dihydropyridine, 1-n-butyl-2-keto-3-(4'-ethyl)-pyridinium chloride-4-methyl-6-hydroxy-1,2-dihydropyridine, 1-(2''-ethyl)-hexyl-2-keto-3-(3'-cyano)-pyridinium chloride-4-methyl-6-hydroxy-1,2-dihydropyridine, 1-(2''-hydroxy)-ethyl-2-keto-3-(2'-methoxy)-pyridinium chloride-4-methyl-6-hydroxy-1,2-dihydropyridine, 1-(2''-N'''-methylpiperazinyl-ethyl-2-keto-3-(2'-methyl)-pyridinium chloride-4-carbethoxy-6-hydroxy-1,2-dihydropyridine, 1-(2''-hydroxyethylamino)-ethyl-2-keto-3-(3'-methyl)-pyridinium chloride-4-methyl-6-hydroxy-1,2-dihydropyridine.

The aforenamed coupling components can also be employed in the procedures of Examples 1, 2, 4, 5 and 6.

EXAMPLE 4

12.1 Parts of 1-amino-2,5-dimethylbenzene are diazotized by the known method with 6.9 parts of sodium nitrite. 42 parts of 1-(2''-ethyl)-hexyl-2-keto-3-quinolinium chloride-4-methyl-6-hydroxy-1,2-dihydropyridine (prepared by condensation of acetoacetic ester with quinolinium chloride acetic acid-2-ethylhexylamide in iso-propanol by means of magnesium oxide) are dissolved in 200 parts of water and the solution added dropwise to the ice-cold diazo solution. Sodium acetate is then added and the reaction solution raised to 45°. The dye formed is precipitated by the addition of sodium chloride and purified by recrystallization. A yellow water-soluble powder is obtained which dyes polyacrylonitrile and acrylonitrile copolymer fibres in fast yellow shades.

Dyes of equally good quality are obtained when the 12.1 parts of 1-amino-2,5-dimethylbenzene used in the foregoing Example are replaced by an equivalent amount of one of the amines named after Example 2, using the procedure of Example 4. Other valuable dyes can be produced by the same procedure using, in place of the 42 parts of 1-(2''-ethyl)-hexyl-2-keto-3-quinolinium chloride-4-methyl-6-hydroxyl-1,2-dihydropyridine, the equivalent amount of 1-methyl-2-keto-3-isoquinolinium chloride-4-methyl-6-hydroxy-1,2-dihydropyridine. These coupling components can also be employed in the other Examples.

EXAMPLE 5

12.3 Parts of 1-amino-4-methoxybenzene are diazotized by the normal method with 6.9 parts of sodium nitrite. 33 Parts of 1-phenyl-2-keto-3-pyridinium chloride-4-methyl-6-hydroxy-1,2-dihydropyridine (prepared by condensation of pyridinium chloride acetic anilide with acetoacetic ester in ethanol and sodium hydroxide) are dissolved in 200 parts of water and the solution dropped into the ice-cold diazo solution. Sodium acetate is gradually added with stirring at 0°–5°, stirring being continued to completion of the reaction. The temperature is increased to 50° and the dye precipitated from solution with sodium chloride. It is obtained as a water-soluble powder which gives level yellow dyeings on polyacrylonitrile fibres.

Dyes of comparable quality can be produced by the procedure of the foregoing Example with the 12.3 parts of 1-amino-4-methoxybenzene replaced by an equivalent amount of one of the amines listed after Example 2. Other equally good dyes are obtainable by the same procedure using, in place of the 33 parts of 1-phenyl-2-keto-3-pyridinium chloride-4-methyl-6-hydroxy-1,2-dihydropyridine, the equivalent amount of 1-(2''-chloro)-phenyl-2-keto-3-pyridinium chloride-4-methyl-6-hydroxy-1,2-dihydropyridine or 1-(3''-methyl)-phenyl-2-keto-3-(2'-methyl)-pyridinium chloride-4-methyl-6-hydroxy-1,2-dihydropyridine. The aforenamed coupling components can also be employed in Examples 1 to 4 and 6.

EXAMPLE 6

12.75 Parts of 1-amino-2-chlorobenzene are diazotized with 6.9 parts of sodium nitrite. 30 Parts of 1-dimethylamino-2-keto-3-pyridinium chloride-4-methyl-6-hydroxy-1,2-dihydropyridine (prepared by condensation of pyridinium chloride acetic acid-N',N'-dimethyl hydrazide with acetoacetic ester in the presence of magnesium oxide) are dissolved in 200 parts of water and the solution dropped into the ice-cold diazo solution. At the same time an aqueous sodium acetate solution is dropped in. After the coupling reaction is complete, the dye formed is precipitated from solution with sodium chloride in the form of yellow water-soluble crystals. It gives fast yellow dyeings on polyacrylonitrile fibres.

Comparably good dyes can be produced by the procedure of this Example by replacing the 12.75 parts of 1-amino-2-chlororobenzene by the equivalent amount of one of the amines named after Example 2. Other equally good dyes are obtainable by this procedure using, in place of the 30 parts of 1-dimethylamino-2-keto-3-pyridinium chloride-4-methyl-6-hydroxy-1,2-dihydropyridine an equivalent amount of 1-amino-2-keto-3-pyridinium chloride-4-methyl-6-hydroxy-1,2-dihydropyridine, 1-pyrrolidinyl-2-keto-3-pyridinium chloride-4-methyl-6-hydroxy-1,2-dihydropyridine, 1-(N-methyl)-piperazinyl-2-keto-3-pyridinium chloride-4-methyl-6-hydroxy-1,2-dihyropyridine, 1-morpholinyl-2-keto-3-pyridinium chloride-4-methyl-6-hydroxy-1,2-dihydropyridine, 1-(4'-dimethylamino)-phenyl-2-keto-3-(2''methyl)-pyridinium chloride-4-methyl-6-hydroxy-1,2-dihydropyridine, 1-amino-2-keto-3-pyridinium chloride-4-carbethoxy-6-hydroxy-1,2-dihydropyridine, 1-dimethylamino-2-keto-3-pyridinium chloride-4-phenyl-6-hydroxy-1,2-dihydropyridine, 1-(3'-dimethylamino)-n-propyl-2-keto-3-pyridinium chloride-4-methyl-6-hydroxy-1,2-dihydropyridine, 1-(3'-dibutylamino)-n-propyl-2-keto-3-pyridinium chloride-4-methyl-6-hydroxy-1,2-dihydropyridine, 1-(2'-diethylamino)-ethyl-2-keto-3-pyridinium chloride-4-methyl-6-hydroxy-1,2- dihydropyridine, 1-(2'-dihydroxyethylamino)-ethyl-2-keto-3-pyridinium chloride-4-methyl-6-hydroxy-1,2-dihydropyridine, 1-[2'-(2''-hydroxy)-ethylamino]-2-keto-3-pyridinium chloride-4-methyl-6-hydroxy-1,2-dihydropyridine, 1-(2'-morpholinyl)-ethyl-2-keto-3-pyridinium chloride-4-methyl-6-hydroxy-1,2-dihydropyridine, 1-(2'-N-methylpiperazinyl)-ethyl-2-keto-3-pyridinium chloride-4-methyl-6-hydroxy-1,2-dihydropyridine.

The aforenamed coupling components can be employed in the other Examples.

EXAMPLE 7

21.9 Parts of 3-aminobenzoic acid-3'-dimethylamino-n-propylamide are diazotized at 0°. An ice-cold aqueous hydrochloric acid solution of 25 parts of 3-pyridinium chloride-2,6-di-hydroxy-4-methylpyridine is added to the hydrochloric acid diazo solution. The pH of the reaction solution is adjusted to 2.5 by dropping in 50 percent aqueous sodium acetate solution. After formation of the dye it is salted out with sodium chloride and collected on a filter. The dye is a yellow water-soluble powder which gives greenish yellow dyeings of good light and wet fastness on polyacrylonitrile fibres.

EXAMPLE 7*a*

A solution of 14.15 parts of 1-amino-3-chloro-4-methylbenzene in 200 parts of 6 percent hydrochloric acid is diazotized at 0° with 6.9 parts of sodium nitrite. 31 Parts of 2-keto-3-pyridinium chloride-4-carbethoxy-6-hydroxy-1,2-dihydropyridine (prepared by reacting pyridinium chloride acetamide with oxalacetic diethyl ester in methanolic sodium hydroxide solution) are dissolved in 200 parts of water and the solution added dropwise to the ice-cold diazo solution. Finally, 15 parts of crystallized sodium acetate are added. The coupling solution is stirred at 0°–20°, whereupon the temperature increases to 40°. Hydrochloric acid is added to adjust to a mineral acid reaction, then the dye formed is salted out with sodium chloride and collected on a filter. The resulting yellow water-soluble powder has the formula

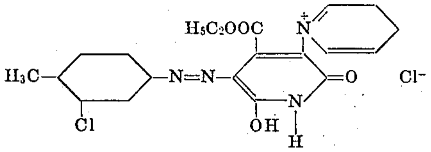

and dyes polyacrylonitrile fibres in fast yellow shades.

EXAMPLE 7*b*

A solution of 14.15 parts of 1-amino-3-chloro-4-methylbenzene in 200 parts of 6 percent hydrochloric acid is diazotized at 0° with 6.9 parts of sodium nitrite. 31 parts of 2-keto-3-pyridinium chloride-4-N,N-dimethylcarbamoyl-6-hydroxy-1,2-dihydropyridine (prepared by reacting 2-keto-3-pyridinium chloride-4-carbethoxy-6-hydroxy-1,2-dihydropyridine with dimethylamine) are dissolved in 200 parts of water and the solution added dropwise to the ice-cold diazo solution. After the addition of 15 parts of crystallized sodium acetate the coupling solution is stirred at 0°–20°, then the temperature is increased to 40°. Hydrochloric acid is added to ajust to a mineral acid reaction and the dye formed salted out with sodium chloride and collected on a filter. It is a yellow water-soluble powder of the formula

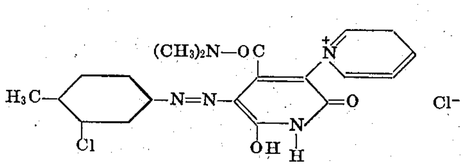

which dyes polyacrylonitrile fibres in fast yellow shades.

The structures of further dyes are shown in the following table. They can be produced as described in the foregoing Examples and correspond to the formula

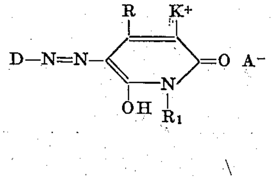

where D, R, $R_1$ and $K^+$ have the meanings assigned to them in the table. The anion $A^-$ may be any of those named in the disclosure.

| Example number | D=Radical of the diazo compound | R | $R_1$ | $K^+$ | Shade of dyeing on polyacrylnitrile fibres |
|---|---|---|---|---|---|
| 8 | 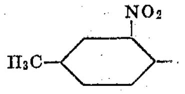 | 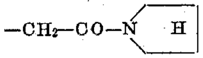 | H | 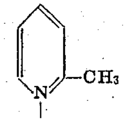 | Yellow. |
| 9 | 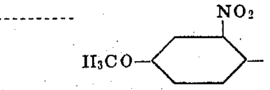 | $C_2H_5-O-CH_2-$ | H | 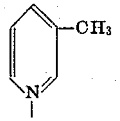 | Orange. |
| 10 | 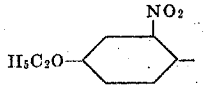 | $CH_3-O-CH_2-$ | $-CH_3$ | 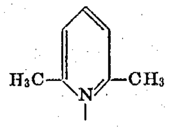 | Do. |
| 11 | 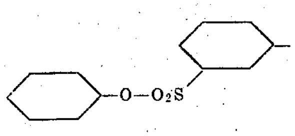 | $CH_3-$ | $-(CH_2)_3-CH_3$ | 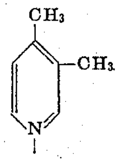 | Yellow. |
| 12 | 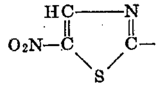 | $CH_3-$ | 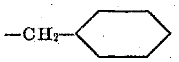 | 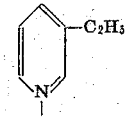 | Red. |
| 13 | 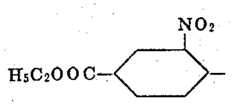 | 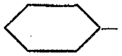 | H | 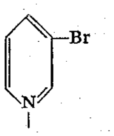 | Do. |
| 14 | 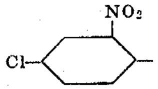 | $C_2H_5-$ | H | 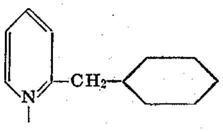 | Yellow. |
| 15 | 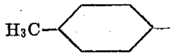 | $-CH_2COOCH_3$ | H | 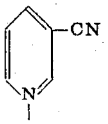 | Do. |

—Continued
| Example number | D=Radical of the diazo compound | R | $R_1$ | $K^+$ | Shade of dyeing on polyacrylnitrile fibres |
|---|---|---|---|---|---|
| 16 | 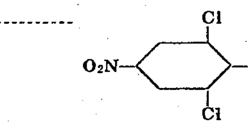 | $CH_3$ | H | 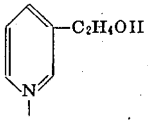 | Do. |
| 17 | 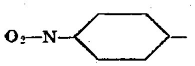 | $-CH_2-SO_2-CH_3$ | H | 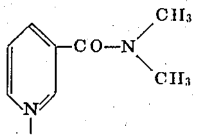 | Do. |
| 18 | 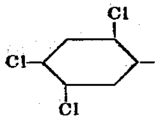 | 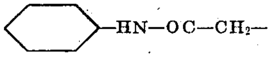 | H | 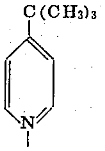 | Do. |
| 19 | 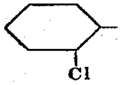 | $CN-CH_2-$ | 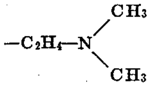 | 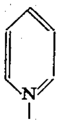 | Do. |
| 20 | 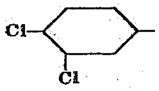 | 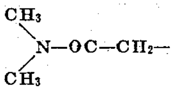 | 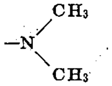 | Same as above | Do. |
| 21 |  | $-CH_3$ | 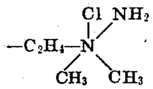 | do | Do. |
| 22 | 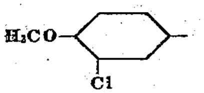 | $-CH_3$ | 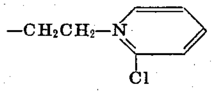 | do | Orange. |
| 23 | 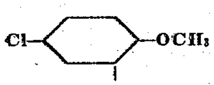 | $-CH_3$ | 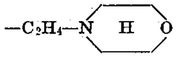 | do | Do. |
| 24 | 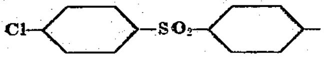 | $-CH_3$ | 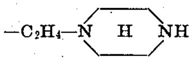 | do | Yellow. |
| 25 | 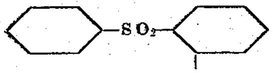 | $-CH_3$ | 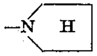 | do | Orange. |

—Continued
| Example number | D=Radical of the diazo compound | R | $R_1$ | $K^+$ | Shade of dyeing on polyacrylnitrile fibres |
|---|---|---|---|---|---|
| 26 | 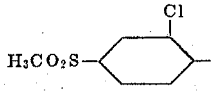 | $CH_3-$ | 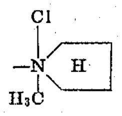 | do | Yellow. |
| 27 | 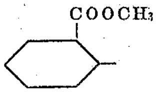 | $CH_3-$ |  | do | Do. |
| 28 | 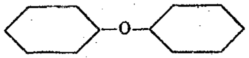 | 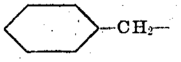 | 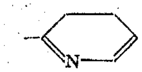 | do | Orange. |
| 29 | 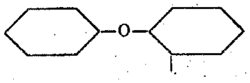 | $CH_3-$ | $-C_2H_4OH$ | do | Yellow. |
| 30 | 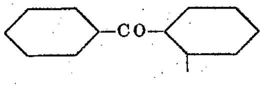 | $CH_3-$ | 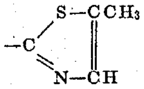 | do | Do. |
| 31 | 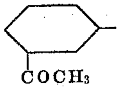 | $CH_3-$ | 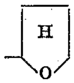 | 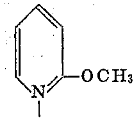 | Do. |
| 32 |  | $CH_3-$ | 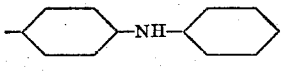 | 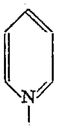 | Do. |
| 33 | 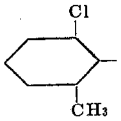 | $CH_3-$ | 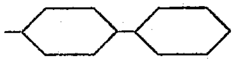 | Same as above | Do. |
| 34 | 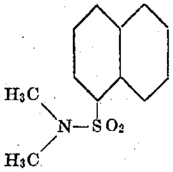 | H | H | 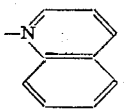 | Red. |

—Continued
| Example number | D=Radical of the diazo compound | R | $R_1$ | $K^+$ | Shade of dyeing on polyacrylnitrile fibres |
|---|---|---|---|---|---|
| 35 | 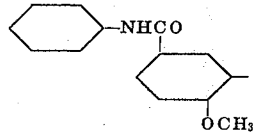 | $CH_3$— | H | 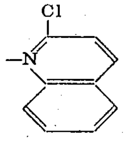 | Red. |
| 36 | 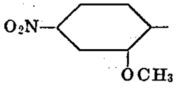 | $CH_3$— | H | 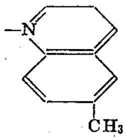 | Orange. |
| 37 | 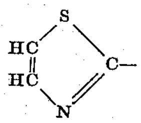 | $CH_3$— | H | 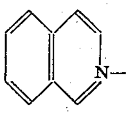 | Red. |
| 38 | 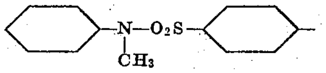 | $CH_3$— | H | 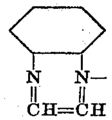 | Yellow. |
| 39 | 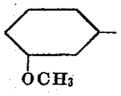 | $CH_3$— | H | 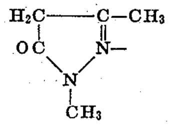 | Do. |
| 40 | 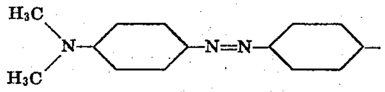 | $CH_3$— | H | 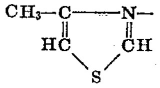 | Orange. |
| 41 | 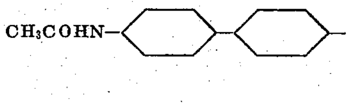 | $CH_3$— | H | 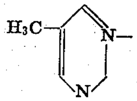 | Red. |
| 42 | 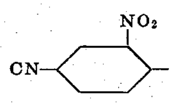 | $CH_3$— | H | 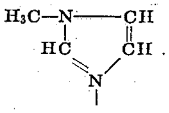 | Yellow. |

–Continued
| Example number | D=Radical of the diazo compound | R | $R_1$ | $K^+$ | Shade of dyeing on polyacrylnitrile fibres |
|---|---|---|---|---|---|
| 43 | 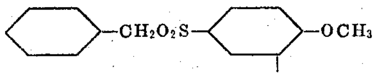 | H | H | 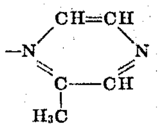 | Orange. |
| 44 | 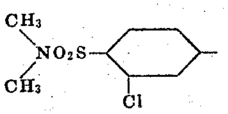 | $CH_3$— | H | 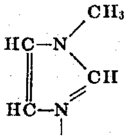 | Yellow. |
| 45 | 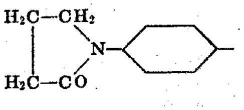 | $CH_3$— | H | 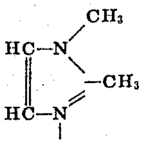 | Orange. |
| 46 | 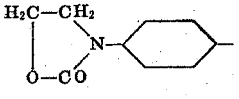 | $CH_3$— | H | 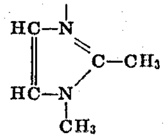 | Do. |
| 47 | 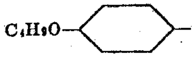 | $CH_3$— | H | 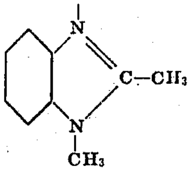 | Do. |
| 48 | 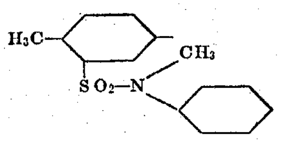 | $CH_3$— | H | 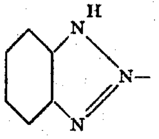 | Yellow. |
| 49 | 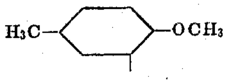 | $CH_3$— | H | 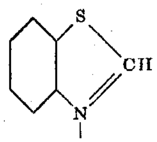 | Orange. |

–Continued
| Example number | D=Radical of the diazo compound | R | $R_1$ | $K^+$ | Shade of dyeing on polyacrylnitrile fibres |
|---|---|---|---|---|---|
| 50 | 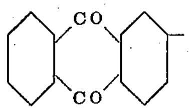 | $CH_3$— | H | 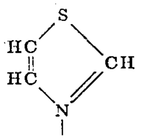 | Do. |
| 51 | 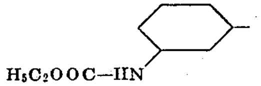 | $CH_3$— | H | 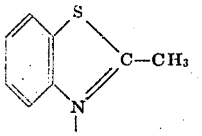 | Yellow. |
| 52 | 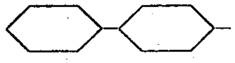 | 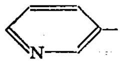 | H | 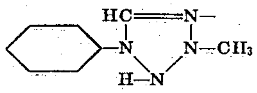 | Orange. |
| 53 | 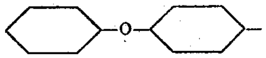 | $CH_3$— | H | 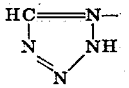 | Do. |
| 54 | 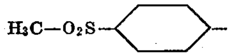 | $CH_3$— | H | 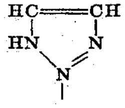 | Yellow. |
| 55 | 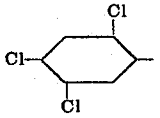 | $CH_3$— | H | 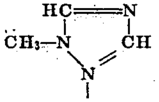 | Do. |
| 56 | 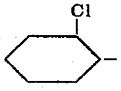 | $CH_3$— | H | 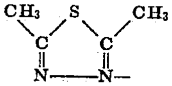 | Do. |
| 57 | 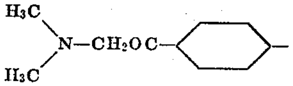 | $CH_3$— | H | 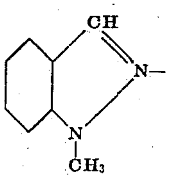 | Do. |
| 58 |  | $—COOC_2H_5$ | H | 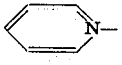 | Do. |

—Continued
| Example number | D = Radical of the diazo compound | R | $R_1$ | $K^+$ | Shade of dyeing on polyacrylnitrile fibres |
|---|---|---|---|---|---|
| 59 | 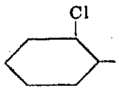 | $-COOC_2H_5$ | H | Same as above | Do. |
| 60 | 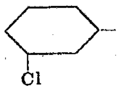 | $-COOC_2H_5$ | H | do | Do. |
| 61 | 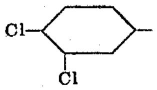 | $-COOC_2H_5$ | H | do | Do. |
| 62 | 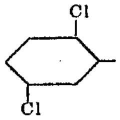 | $-COOC_2H_5$ | H | do | Do. |
| 63 | 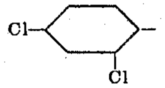 | $-COOC_2H_5$ | H | do | Do. |
| 64 | 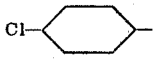 | $-COOC_2H_5$ | H | do | Do. |
| 65 | 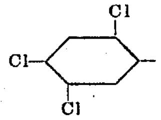 | $-COOC_2H_5$ | H | do | Do. |
| 66 |  | $-COOC_2H_5$ | H | do | Do. |
| 67 | 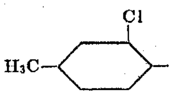 | $-COOC_2H_5$ | H | do | Do. |
| 68 | 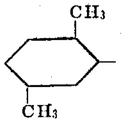 | $-COOC_2H_5$ | H | do | Do. |

-Continued
| Example number | D=Radical of the diazo compound | R | $R_1$ | $K^+$ | Shade of dyeing on polyacrylnitrile fibres |
|---|---|---|---|---|---|
| 69 | 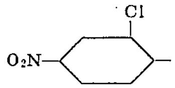 | $-COOC_2H_5$ | H | do | Do. |
| 70 | 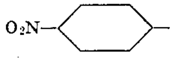 | $-COOC_2H_5$ | H | do | Do. |
| 71 | 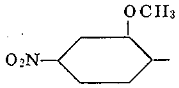 | $-COOC_2H_5$ | H | do | Do. |
| 72 | 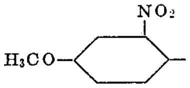 | $-COOC_2H_5$ | H | do | Orange. |
| 73 | 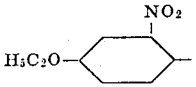 | $-COOC_2H_5$ | H | do | Do. |
| 74 | 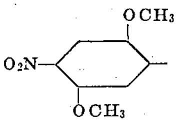 | $-COOC_2H_5$ | H | do | Red. |
| 75 | 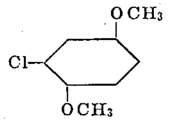 | $-COOC_2H_5$ | H | do | Red. |
| 76 | 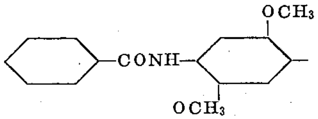 | $-COOC_2H_5$ | H | do | Red-blue. |
| 77 | 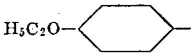 | $-COOC_2H_5$ | H | do | Orange. |
| 78 | Same as above | $-COOC_2H_5$ | H | 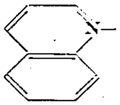 | Red. |

–Continued
| Example number | D=Radical of the diazo compound | R | $R_1$ | $K^+$ | Shade of dyeing on polyacrylnitrile fibres |
|---|---|---|---|---|---|
| 79 | 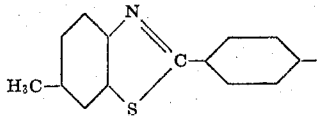 | $-COOCH_3$ | H | 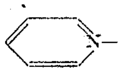 | Orange. |
| 80 | 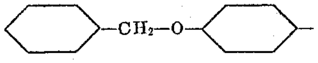 | $-COOCH_3$ | H | Same as above | Do. |
| 81 | 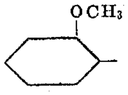 | $-COOCH_3$ | H | do | Yellow. |
| 82 | 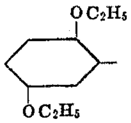 | $-COOCH_3$ | H | 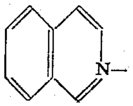 | Red. |
| 83 | 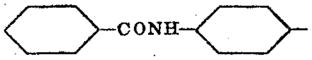 | $-COOCH_3$ | H | 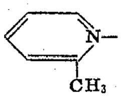 | Orange. |
| 84 | 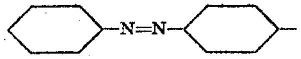 | $-COOCH_3$ | H | 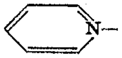 | Red. |
| 85 | 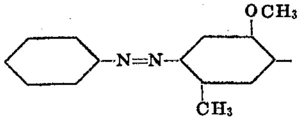 | $-COOCH_3$ | H | Same as above | Red. |
| 86 | 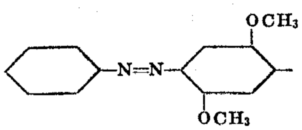 | $-COOCH_3$ | H | do | Blue-red. |
| 87 | 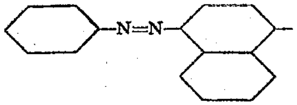 | $-COOCH_3$ | H | do | Red-blue. |
| 88 | 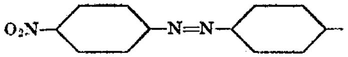 | $-COOCH_3$ | H | do | Red. |
| 89 | 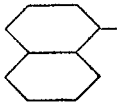 | $-COOCH_3$ | H | do | Orange. |

–Continued
| Example number | D = Radical of the diazo compound | R | $R_1$ | $K^+$ | Shade of dyeing on polyacrylnitrile fibres |
|---|---|---|---|---|---|
| 90 | 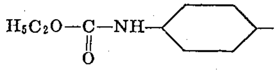 | $-COOCH_3$ | H | do | Do. |
| 91 | 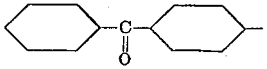 | $-COOCH_3$ | H | do | Yellow. |
| 92 | 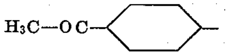 | $-COOCH_3$ | H | do | Do. |
| 93 | 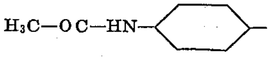 | $-COOCH_3$ | H | do | Orange. |
| 94 | 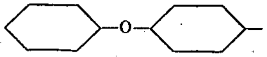 | $-COOCH_3$ | H | do | Yellow. |
| 95 | 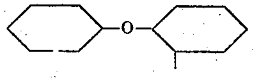 | $-COOCH_3$ | H | do | Do. |
| 96 | 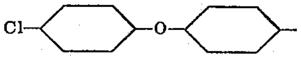 | $-COOCH_3$ | H | do | Do. |
| 97 | 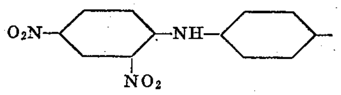 | $-COOCH_3$ | H | do | Red. |
| 98 | 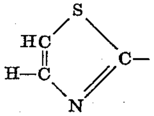 | $-COOCH_3$ | H | do | Red. |
| 99 | 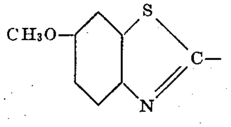 | $-COOCH_3$ | H | do | Red. |
| 100 | 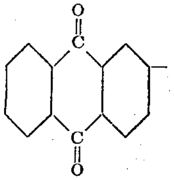 | $-COOCH_3$ | H | do | Red. |

—Continued
| Example number | D=Radical of the diazo compound | R | $R_1$ | $K^+$ | Shade of dyeing on polyacrylnitrile fibres |
|---|---|---|---|---|---|
| 101 | 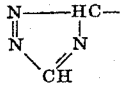 | $-COOC_2H_5$ | H | do | Yellow. |
| 102 | 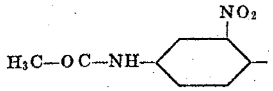 | $-COOC_2H_5$ | H | do | Red. |
| 103 | 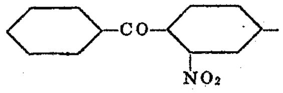 | $-COOC_2H_5$ | H | do | Red. |
| 104 | 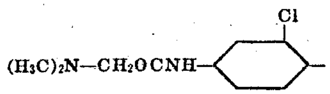 | $-COOC_2H_5$ | H | do | Red. |
| 105 | 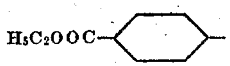 | $-COOC_2H_5$ | H | do | Yellow. |
| 106 | 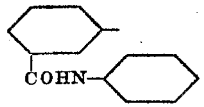 | $-COOC_2H_5$ | H | do | Do. |
| 107 | 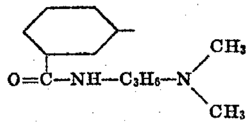 | $-COOC_2H_5$ | H | do | Do. |
| 108 | 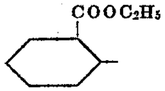 | $-COOC_2H_5$ | H | do | Do. |
| 109 | 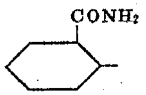 | $-COOC_2H_5$ | H | do | Do. |
| 110 |  | $-COOC_2H_5$ | H | do | Do. |
| 111 | 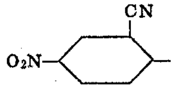 | $-COOC_2H_5$ | H | do | Do. |

–Continued
| Example number | D=Radical of the diazo compound | R | $R_1$ | $K^+$ | Shade of dyeing on polyacrylnitrile fibres |
|---|---|---|---|---|---|
| 112 | 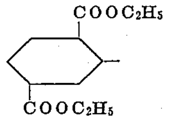 | $-COOC_2H_5$ | H | do | Do. |
| 113 | 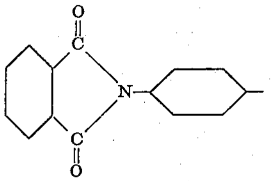 | $-COOC_2H_5$ | H | do | Red. |
| 114 | 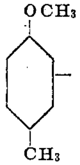 | $-COOC_2H_5$ | H | do | Orange. |
| 115 | 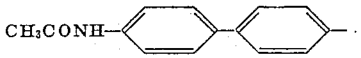 | $-COOC_2H_5$ | H | do | Red. |
| 116 | 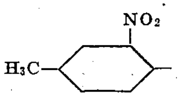 | $-COOC_2H_5$ | H | do | Yellow. |
| 117 | 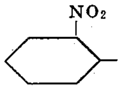 | $-COOC_2H_5$ | H | do | Do. |
| 118 | 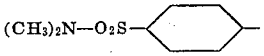 | $-COOC_2H_5$ | H | do | Do. |
| 119 | 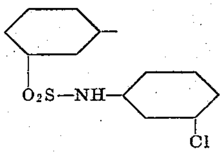 | $-COOC_2H_5$ | H | do | Do. |
| 120 | 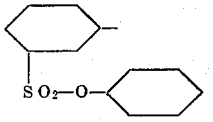 | $-COOC_2H_5$ | H | do | Do. |

—Continued
| Example number | D=Radical of the diazo compound | R | $R_1$ | $K^+$ | Shade of dyeing on polyacrylnitrile fibres |
|---|---|---|---|---|---|
| 121 | 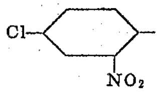 | $-COOC_2H_5$ | H | do | Do. |
| 122 | 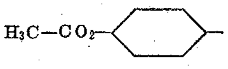 | $-COOC_2H_5$ | H | 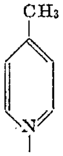 | Do. |
| 123 | 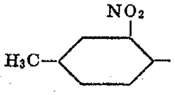 | $-COOC_2H_5$ | H | 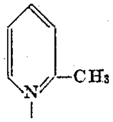 | Do. |
| 124 | 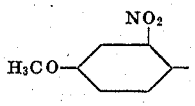 | $-COOC_2H_5$ | H | 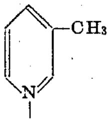 | Orange. |
| 125 | 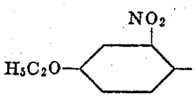 | $-COOC_2H_5$ | $-CH_3$ | 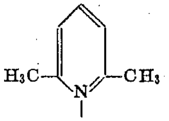 | Do. |
| 126 | 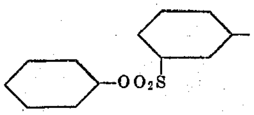 | $-COOC_2H_5$ | $-(CH_2)_3-CH_3$ | 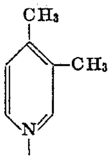 | Yellow. |
| 127 | 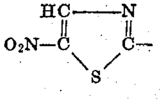 | $-COOC_2H_5$ | 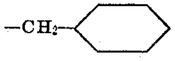 | 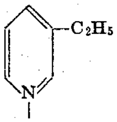 | Red. |
| 128 | 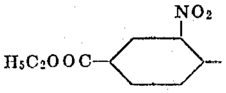 | $-COOC_2H_5$ | H | 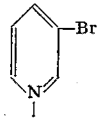 | Red. |

—Continued
| Example number | D=Radical of the diazo compound | R | $R_1$ | K+ | Shade of dyeing on polyacrylnitrile fibres |
|---|---|---|---|---|---|
| 148 | 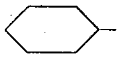 | $-COOC_2H_5$ | 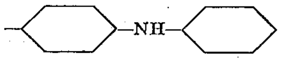 | 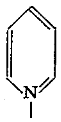 | Do. |
| 149 | 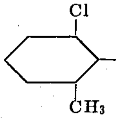 | $-COOC_2H_5$ | 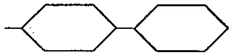 | Same as above | Do. |
| 150 | 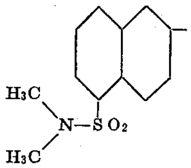 | $-COOC_2H_5$ | H | 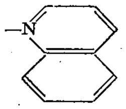 | Red. |
| 151 | 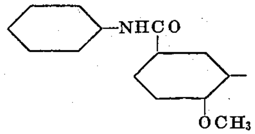 | $-COOC_2H_5$ | H | 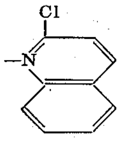 | Red. |
| 152 | 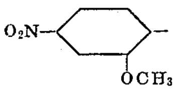 | $-COOC_2H_5$ | H | 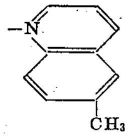 | Orange. |
| 153 | 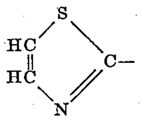 | $-COOC_2H_5$ | H | 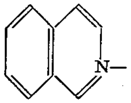 | Red. |
| 154 | 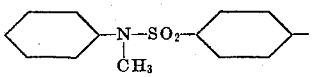 | $-COOC_2H_5$ | H | 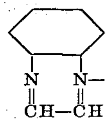 | Yellow. |
| 155 | 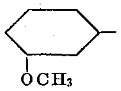 | $-COOC_2H_5$ | H | 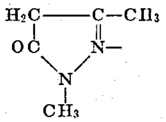 | Do. |

—Continued
| Example number | D=Radical of the diazo compound | R | $R_1$ | $K^+$ | Shade of dyeing on polyacrylnitrile fibres |
|---|---|---|---|---|---|
| 156 | 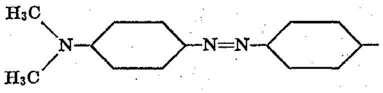 | $-COOC_2H_5$ | H | 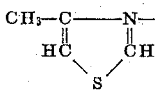 | Orange. |
| 157 |  | $-COOC_2H_5$ | H | 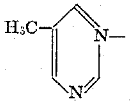 | Red. |
| 158 | 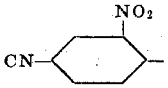 | $-COOC_2H_5$ | H | 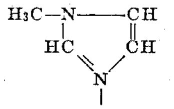 | Yellow. |
| 159 | 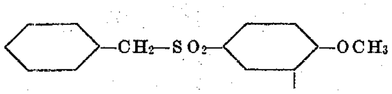 | $-COOC_2H_5$ | H | 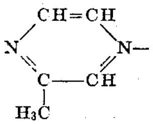 | Orange. |
| 160 | 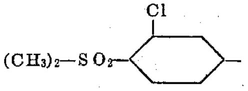 | $-COOC_2H_5$ | H | 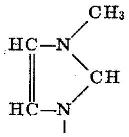 | Yellow. |
| 161 | 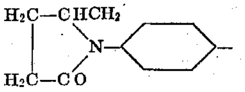 | $-COOC_2H_5$ | H | 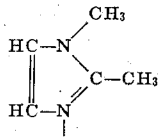 | Orange. |
| 162 | 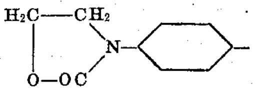 | $-COOC_2H_5$ | H | 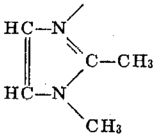 | Do. |
| 163 | 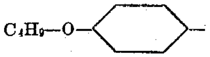 | $-COOC_2H_5$ | H | 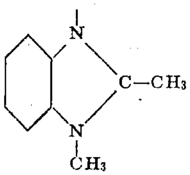 | Do. |

—Continued
| Example number | D=Radical of the diazo compound | R | R₁ | K+ | Shade of dyeing on polyacrylnitrile fibres |
|---|---|---|---|---|---|
| 148 | 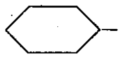 | $-COOC_2H_5$ | 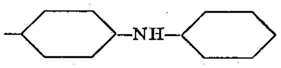 | 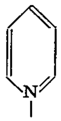 | Do. |
| 149 | 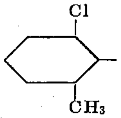 | $-COOC_2H_5$ | 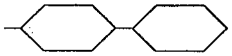 | Same as above | Do. |
| 150 | 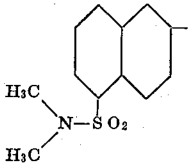 | $-COOC_2H_5$ | H | 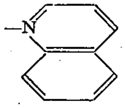 | Red. |
| 151 | 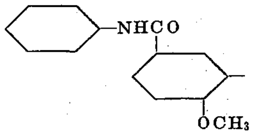 | $-COOC_2H_5$ | H | 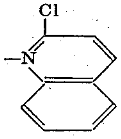 | Red. |
| 152 | 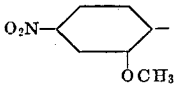 | $-COOC_2H_5$ | H | 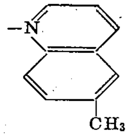 | Orange. |
| 153 | 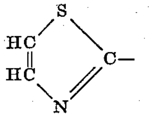 | $-COOC_2H_5$ | H | 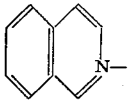 | Red. |
| 154 | 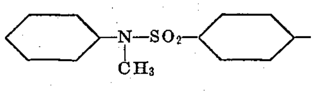 | $-COOC_2H_5$ | H | 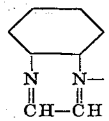 | Yellow. |
| 155 | 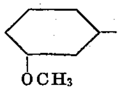 | $-COOC_2H_5$ | H | 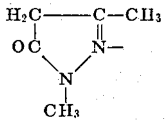 | Do. |

–Continued
| Example number | D=Radical of the diazo compound | R | $R_1$ | $K^+$ | Shade of dyeing on polyacrylnitrile fibres |
|---|---|---|---|---|---|
| 156 | 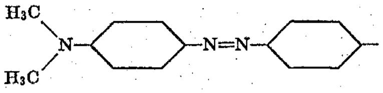 | $-COOC_2H_5$ | H | 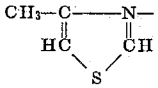 | Orange. |
| 157 | 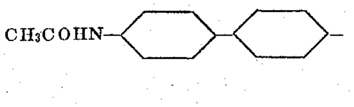 | $-COOC_2H_5$ | H | 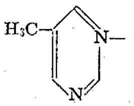 | Red. |
| 158 | 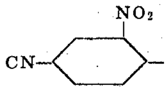 | $-COOC_2H_5$ | H | 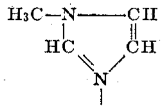 | Yellow. |
| 159 | 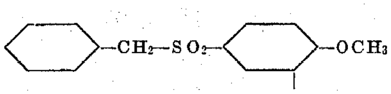 | $-COOC_2H_5$ | H | 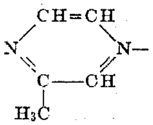 | Orange. |
| 160 | 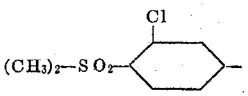 | $-COOC_2H_5$ | H | 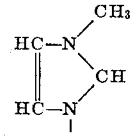 | Yellow. |
| 161 | 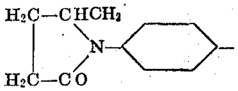 | $-COOC_2H_5$ | H | 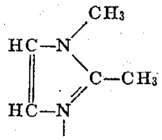 | Orange. |
| 162 | 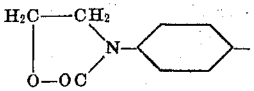 | $-COOC_2H_5$ | H | 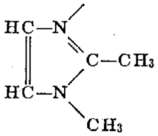 | Do. |
| 163 | 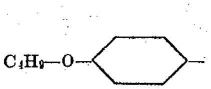 | $-COOC_2H_5$ | H | 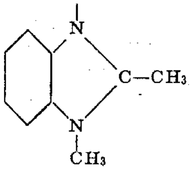 | Do. |

—Continued
| Example number | D=Radical of the diazo compound | R | $R_1$ | $K^+$ | Shade of dyeing on polyacrylnitrile fibres |
|---|---|---|---|---|---|
| 164 | 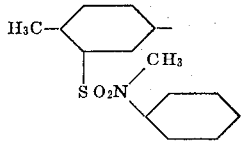 | $-COOC_2H_5$ | H | 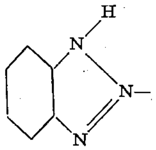 | Yellow. |
| 165 | 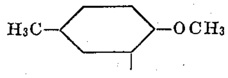 | $-COOC_2H_5$ | H | 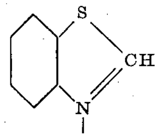 | Orange. |
| 166 | 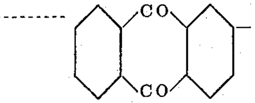 | $-COOC_2H_5$ | H | 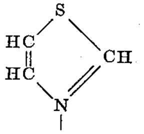 | Do. |
| 167 | 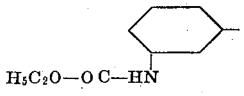 | $-COOC_2H_5$ | H | 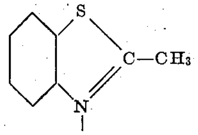 | Yellow. |
| 168 | 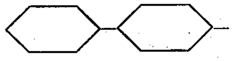 | $-COOC_2H_5$ | H | 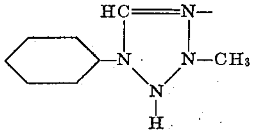 | Do. |
| 169 | 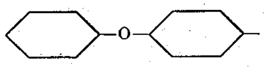 | $-COOC_2H_5$ | H | 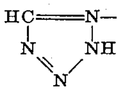 | Orange. |
| 170 | 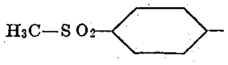 | $-COOC_2H_5$ | H | 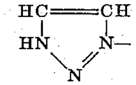 | Yellow. |
| 171 | 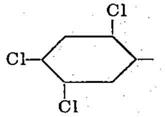 | $-COOC_2H_5$ | H | 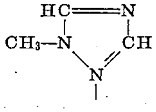 | Do. |

—Continued
| Example number | D = Radical of the diazo compound | R | $R_1$ | $K^+$ | Shade of dyeing on polyacrylnitrile fibres |
|---|---|---|---|---|---|
| 172 | 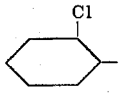 | $-COOC_2H_5$ | H | 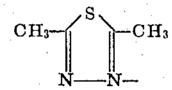 | Do. |
| 173 | 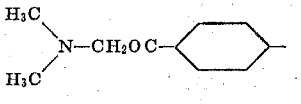 | $-COOC_2H_5$ | H | 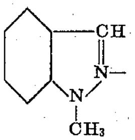 | Do. |
| 174 |  | 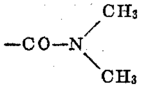 | H | 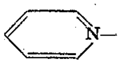 | Do. |
| 175 | 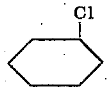 | Same as above | H | Same as above | Do. |
| 176 | 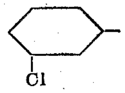 | do | H | do | Do. |
| 177 | 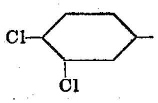 | do | H | do | Do. |
| 178 | 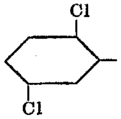 | do | H | do | Do. |
| 179 | 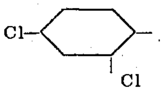 | $-CO-NH_2$ | H | do | Do. |
| 180 | 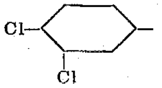 | $-CO-NH_2$ | $-CH_2CN$ | do | Do. |
| 181 | 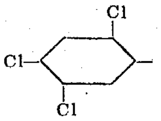 | $-CO-NH_2$ | $-CH_2CN$ | do | Do. |

—Continued
| Example number | D = Radical of the diazo compound | R | $R_1$ | $K^+$ | Shade of dyeing on polyacrylnitrile fibres |
|---|---|---|---|---|---|
| 182 | 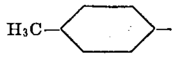 | $-CO-NH_2$ | $-CONH-CH_3$ | do | Do. |
| 183 | 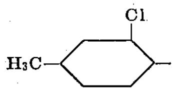 | $-CO-NH_2$ | $-CONH-CH_3$ | do | Do. |
| 184 | 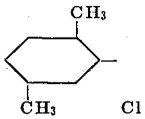 | $-CO-NH_2$ | $-CH_2COOC_2H_5$ | do | Do. |
| 185 | 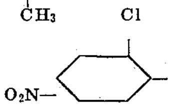 | $-CO-NH-CH_3$ | $-CH_2COOC_2H_5$ | do | Do. |
| 186 | 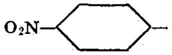 | $-CONH-C_4H_9$ | H | do | Do. |
| 187 | 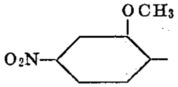 | $-CONH-C_4H_9$ | H | do | Do. |
| 188 | 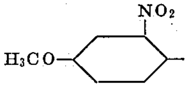 | $-CONH-C_4H_9$ | H | do | Orange. |
| 189 | 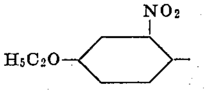 | $-CONH-C_4H_9$ | H | do | Do. |
| 190 | 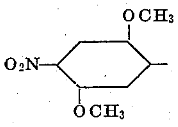 | $-CONH-C_4H_9$ | H | do | Red. |
| 191 | 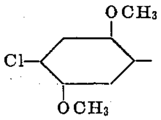 | 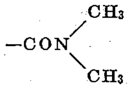 | H | do | Red. |
| 192 | 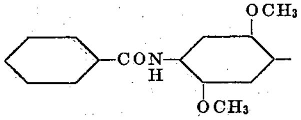 | Same as above | H | do | Red-blue. |

-Continued
| Example number | D=Radical of the diazo compound | R | $R_1$ | $K^+$ | Shade of dyeing on polyacrylnitrile fibres |
|---|---|---|---|---|---|
| 204 | 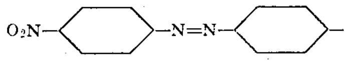 | Same as above | H | do | Red. |
| 205 | 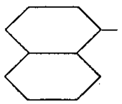 | do | H | do | Orange. |
| 206 | 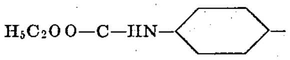 | 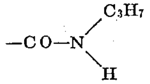 | H | do | Do. |
| 207 | 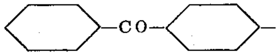 | Same as above | H | do | Yellow. |
| 208 | 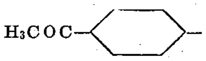 | do | H | do | Do. |
| 209 | 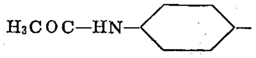 | do | H | do | Orange. |
| 210 | 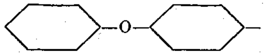 | 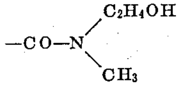 | H | do | Yellow. |
| 211 | 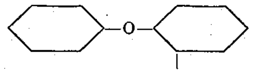 | Same as above | H | do | Do. |
| 212 | 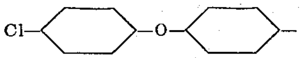 | do | H | do | Do. |
| 213 | 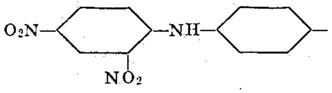 | do | H | do | Red. |
| 214 | 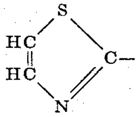 | do | H | do | Red. |
| 215 | 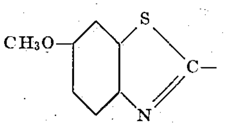 | 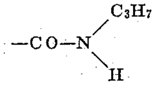 | H | do | Red. |

–Continued
| Example number | D=Radical of the diazo compound | R | $R_1$ | $K^+$ | Shade of dyeing on polyacrylnitrile fibres |
|---|---|---|---|---|---|
| 216 | 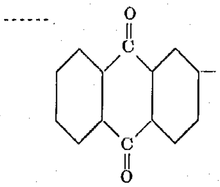 | Same as above | H | do | Red. |
| 217 | 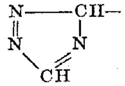 | 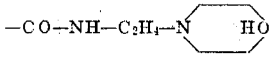 | H | do | Yellow. |
| 218 | 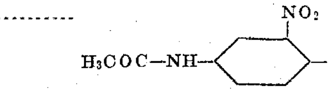 | Same as above | H | do | Red. |
| 219 | 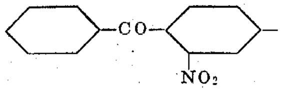 | 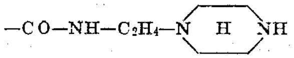 | H | do | Red. |
| 220 | 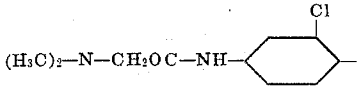 | Same as above | H | do | Red. |
| 221 | 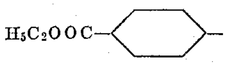 | do | H | do | Yellow. |
| 222 | 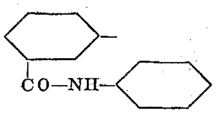 | do | H | do | Do. |
| 223 | 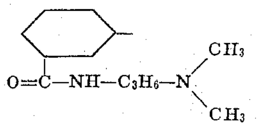 | do | H | do | Do. |
| 224 | 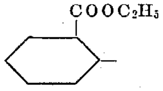 | 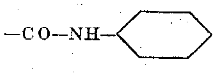 | H | do | Do. |
| 225 | 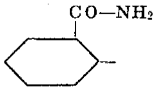 | Same as above | H | do | Do. |

–Continued
| Example number | D=Radical of the diazo compound | R | $R_1$ | $K^+$ | Shade of dyeing on polyacrylnitrile fibres |
|---|---|---|---|---|---|
| 226 |  | do | H | do | Do. |
| 227 | 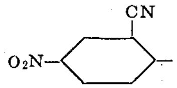 | 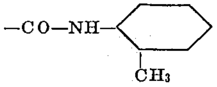 | H | do | Do. |
| 228 | 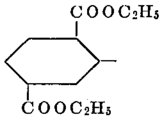 | Same as above | H | do | Do. |
| 229 | 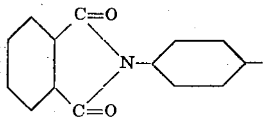 | do | H | do | Red. |
| 230 | 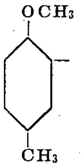 | 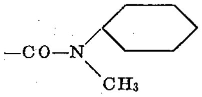 | H | do | Orange. |
| 231 | 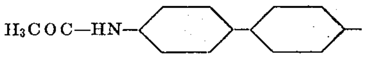 | Same as above | H | do | Red. |
| 232 | 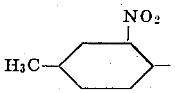 | do | H | do | Yellow. |
| 233 | 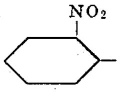 | 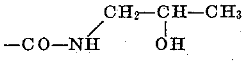 | H | do | Do. |
| 234 | 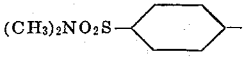 | Same as above | H | do | Do. |
| 235 | 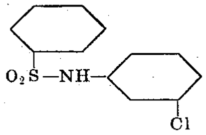 | do | H | do | Do. |

—Continued
| Example number | D = Radical of the diazo compound | R | $R_1$ | $K^+$ | Shade of dyeing on polyacrylnitrile fibres |
|---|---|---|---|---|---|
| 236 | 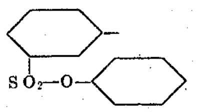 | 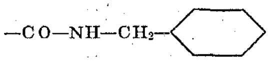 | H | do | Do. |
| 237 | 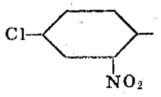 | Same as above | H | do | Do. |
| 238 | 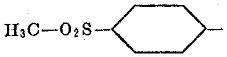 | 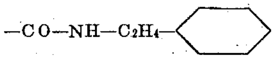 | H |  | Do. |
| 239 | 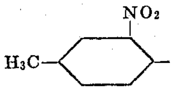 | Same as above | H | 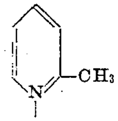 | Do. |
| 240 | 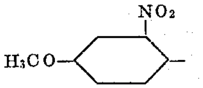 | do | H | 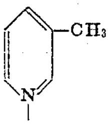 | Orange. |
| 241 | 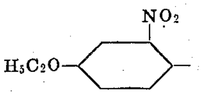 | 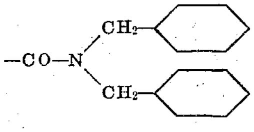 | $CH_3$ | 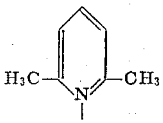 | Do. |
| 242 | 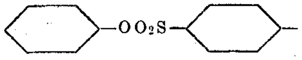 | Same as above | $-(CH_2)_3-CH_3$ | 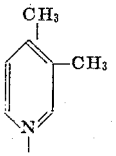 | Yellow. |
| 243 | 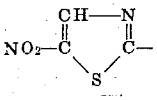 | 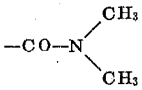 | 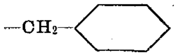 | 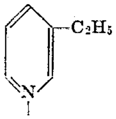 | Red. |

–Continued
| Example number | D=Radical of the diazo compound | R | $R_1$ | $K^+$ | Shade of dyeing on polyacrylnitrile fibres |
|---|---|---|---|---|---|
| 244 | 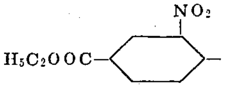 | Same as above | H | 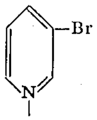 | Red. |
| 245 | 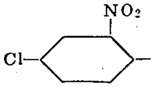 | do | H | 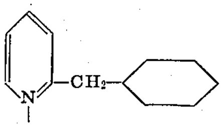 | Yellow. |
| 246 | 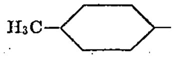 | do | H | 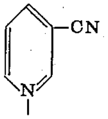 | Do. |
| 247 | 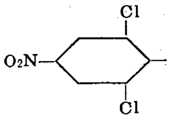 | 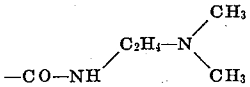 | H | 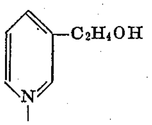 | Yellow-brown. |
| 248 | 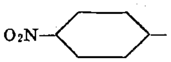 | Same as above | H | 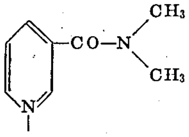 | Yellow. |
| 249 | 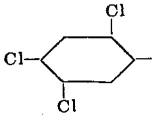 | $-CO-NH-CH_3$ | H | 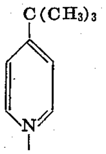 | Do. |
| 250 | 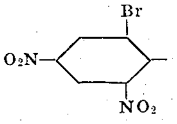 | Same as above | H | 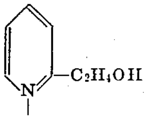 | Do. |
| 251 | 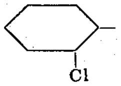 | do | 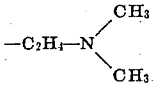 | 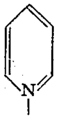 | Do. |

—Continued
| Example number | D=Radical of the diazo compound | R | R₁ | K+ | Shade of dyeing on polyacrylnitrile fibres |
|---|---|---|---|---|---|
| 252 | 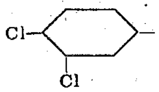 | do | 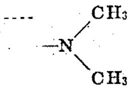 | Same as above | Do. |
| 253 |  | do | 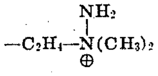 | do | Do. |
| 254 | 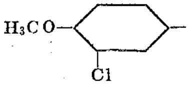 | 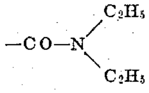 | 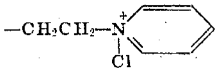 | do | Orange. |
| 255 |  | Same as above | 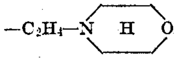 | do | Do. |
| 256 | 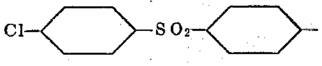 | 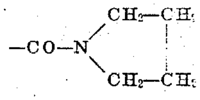 | 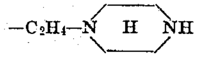 | do | Yellow. |
| 257 | 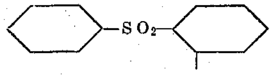 | Same as above | 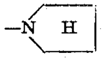 | do | Orange. |
| 258 | 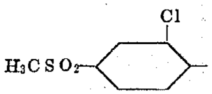 | do | 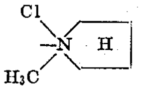 | do | Yellow. |
| 259 | 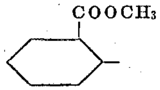 |  |  | do | Do. |
| 260 | 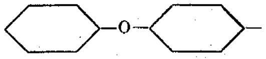 | Same as above | 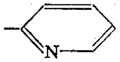 | do | Orange. |
| 261 | 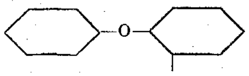 | do | $-C_2H_4-OH$ | do | Yellow. |
| 262 | 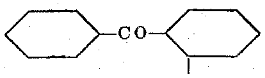 | do | 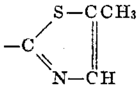 | do | Do. |
| 263 | 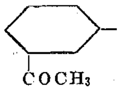 | 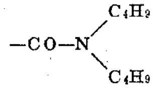 | 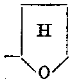 | 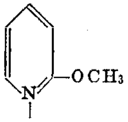 | Do. |

—Continued
| Example number | D=Radical of the diazo compound | R | R₁ | K⁺ | Shade of dyeing on polyacrylnitrile fibres |
|---|---|---|---|---|---|
| 264 | 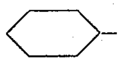 | Same as above | 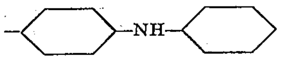 | 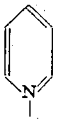 | Do. |
| 265 | 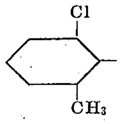 | 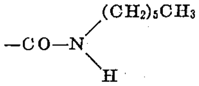 | 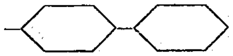 | Same as above | Do. |
| 266 | 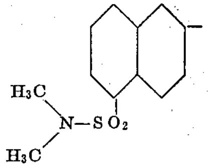 | Same as above | H | 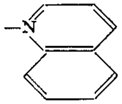 | Do. |
| 267 | 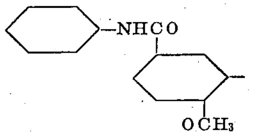 | $-CO-NH_2$ | H | 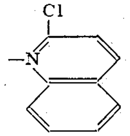 | Red. |
| 268 | 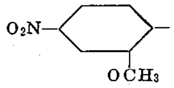 | $-CO-NH_2$ | H | 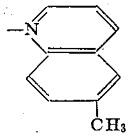 | Orange. |
| 269 | 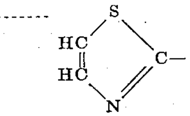 | $-CO-NH_2$ | H | 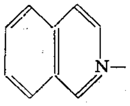 | Red. |
| 270 | 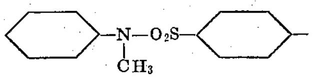 | 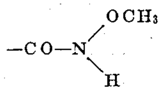 | H | 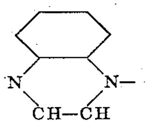 | Yellow. |
| 271 | 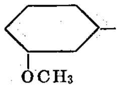 | Same as above | H | 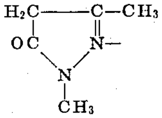 | Do. |

–Continued
| Example number | D=Radical of the diazo compound | R | $R_1$ | $K^+$ | Shade of dyeing on polyacrylnitrile fibres |
|---|---|---|---|---|---|
| 272 | 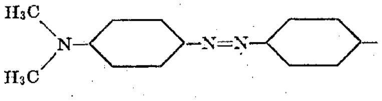 | 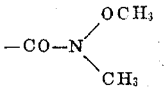 | H | 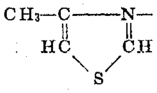 | Orange. |
| 273 |  | Same as above | H | 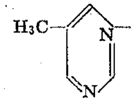 | Red. |
| 274 | 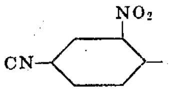 | 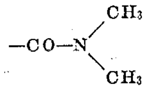 | H | 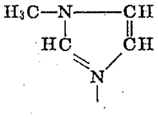 | Yellow. |
| 275 | 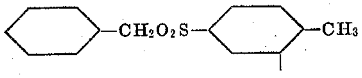 | Same as above | H | 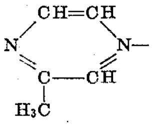 | Orange. |
| 276 | 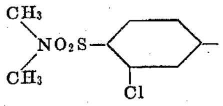 | do | H | 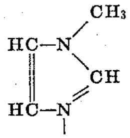 | Yellow. |
| 277 | 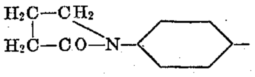 | $-CONH-CH_2CN$ | H | 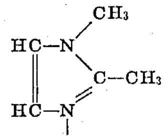 | Orange. |
| 278 | 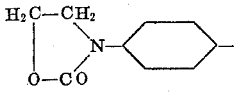 | 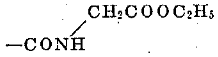 | H | 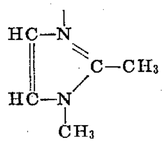 | Do. |
| 279 | 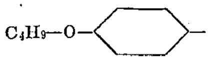 |  | H | 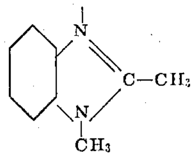 | Do. |

–Continued
| Example number | D=Radical of the diazo compound | R | $R_1$ | K+ | Shade of dyeing on polyacrylnitrile fibres |
|---|---|---|---|---|---|
| 280 | 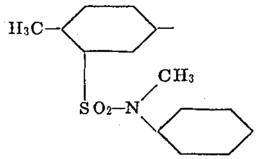 | 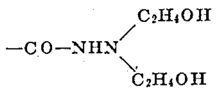 | H | 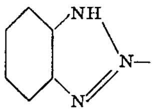 | Yellow. |
| 281 | 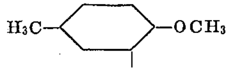 | Same as above | H | 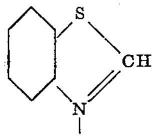 | Orange. |
| 282 | 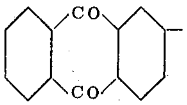 | $-CO-NH-NHC_2H_4OH$ | H | 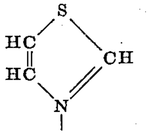 | Do. |
| 283 | 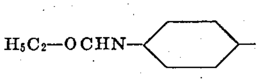 | $-CO-NH-NHC_2H_4OH$ | H | 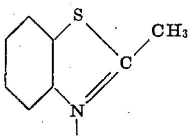 | Yellow. |
| 284 | 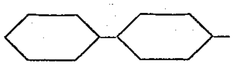 | 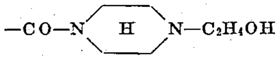 | H | 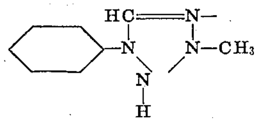 | Orange. |
| 285 | 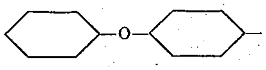 | 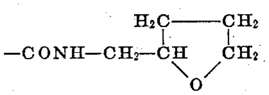 | H | 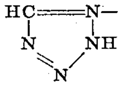 | Do. |
| 286 | 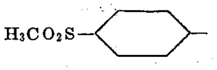 | $-CONH-(CH_2)-OCH_3$ | H | 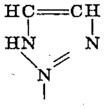 | Yellow. |
| 287 | 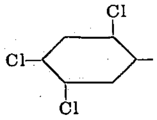 | $-CONH-(CH_2)-OCH_3$ | H | 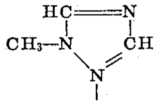 | Do. |

–Continued
| Example number | D=Radical of the diazo compound | R | $R_1$ | $K^+$ | Shade of dyeing on polyacrylnitrile fibres |
|---|---|---|---|---|---|
| 288 | 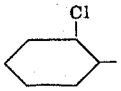 | $-CONH-(CH_2)-OCH_3$ | H | 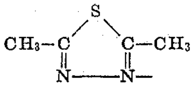 | Do. |
| 289 | 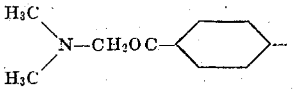 | $-CONH-(CH_3)_2-OCH_3$ | H | 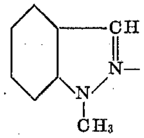 | Do. |
| 290 |  |  | $-CH_2CH_2OH$ | 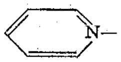 | Do. |
| 291 | 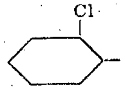 | Same as above | 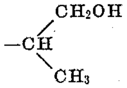 | Same as above | Do. |
| 292 | 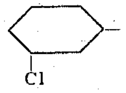 | do | $-CH_2CH_2CH_3$ | do | Do. |
| 293 | 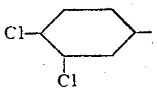 | do | $-(CH_2)_3-OCH_3$ | do | Do. |
| 294 | 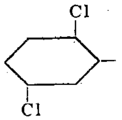 | do | 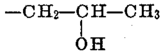 | do | Do. |
| 295 | 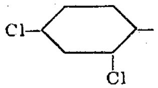 | do | $-(CH_2)_3-OH$ | do | Do. |
| 296 |  | $-CH_3$ | 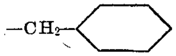 | do | Do. |
| 297 | 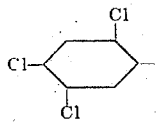 | $-CH_3$ | 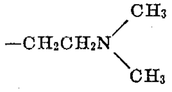 | do | Do. |
| 298 | 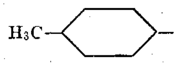 | $-CH_3$ | 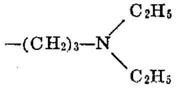 | do | Do. |

—Continued
| Example number | D=Radical of the diazo compound | R | $R_1$ | $K^+$ | Shade of dyeing on polyacrylnitrile fibres |
|---|---|---|---|---|---|
| 299 | 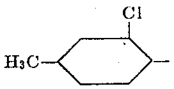 | $-C_2H_5$ | 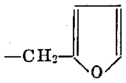 | do | Do. |
| 300 | 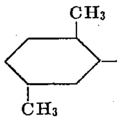 | $-CH_2CH_2CH_3$ | Same as above | do | Do. |
| 301 | 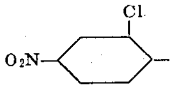 | $-CH_3$ | 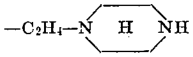 | do | Do. |
| 302 | 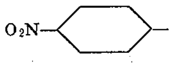 | 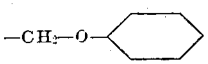 | H | do | Do. |
| 303 | 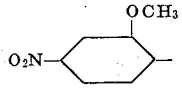 | Same as above | H | 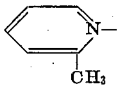 | Do. |
| 304 | 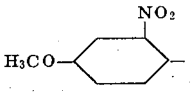 | do | $-C_2H_4OH$ | Same as above | Orange. |
| 305 | 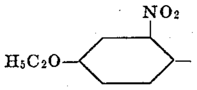 | do | $-C_2H_4OH$ | 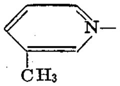 | Do. |
| 306 | 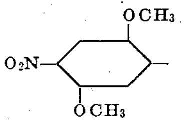 | $-CH_3$ | 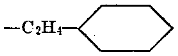 | 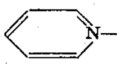 | Red. |
| 307 | 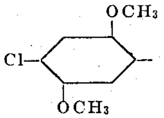 | $-CH_3$ | $CH_3-(CH_2)_3$ | Same as above | Red. |
| 308 | 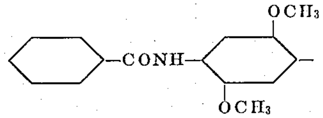 | 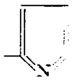 | H | do | Red-blue. |

—Continued

| Example number | D=Radical of the diazo compound | R | $R_1$ | $K^+$ | Shade of dyeing on polyacrylnitrile fibres |
|---|---|---|---|---|---|
| 309 | 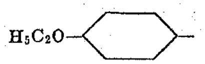 | Same as above |  | do | Orange. |
| 310 | Same as above | do | Same as above | 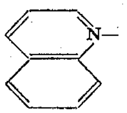 | Red. |
| 311 | 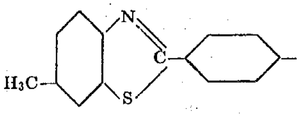 | $-CH_2CH_2CH_3$ | $-(CH_2)_3-OCH_3$ |  | Orange. |
| 312 | 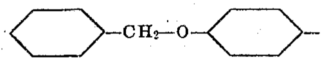 | $-CH_2CH_2CH_3$ | $-(CH_2)_3-OCH_3$ | Same as above | Do. |
| 313 | 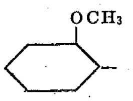 | $-CH_2CH_2CH_3$ | $-(CH_2)_3-OCH_3$ | do | Yellow. |
| 314 | 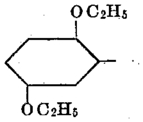 | $-CH_3$ | $-(CH_2)_4-OH$ | do | Red. |
| 315 | 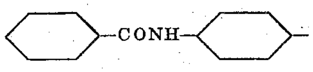 | $-CH_3$ | $-(CH_2)_4-OH$ | 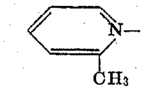 | Orange. |
| 316 | 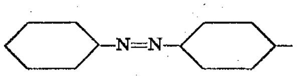 | $-CH_3$ | $-(CH_2)_4-OH$ | 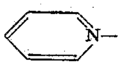 | Red. |
| 317 | 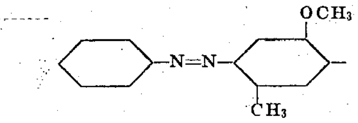 | $-CH_3$ | $-(CH_2)_4-OH$ | Same as above | Red. |
| 318 | 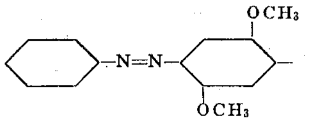 | $-CH_3$ | $-(CH_2)_4-OH$ | do | Blue-red. |
| 319 | 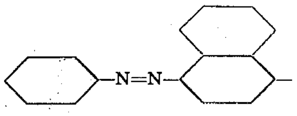 | $-CH_3$ | $-C_2H_4-OH$ | do | Red-blue. |

–Continued
| Example number | D=Radical of the diazo compound | R | $R_1$ | $K^+$ | Shade of dyeing on polyacrylnitrile fibres |
|---|---|---|---|---|---|
| 320 | 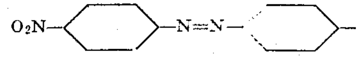 | $-CH_3$ | $-C_2H_4-OH$ | do | Red. |
| 321 | 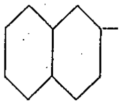 | $-CH_3$ | $-C_2H_4-OH$ | do | Orange. |
| 322 | 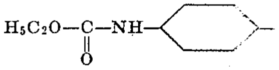 | $-CH_3$ | 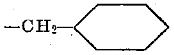 | do | Do. |
| 323 | 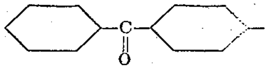 | $-CH_3$ | Same as above | do | Yellow. |
| 324 | 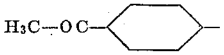 | $-CH_3$ | do | do | Do. |
| 325 | 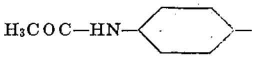 |  | H | do | Orange. |
| 326 | 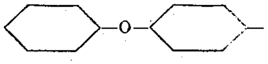 | Same as above | H | do | Yellow. |
| 327 | 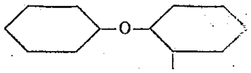 | do | H | do | Do. |
| 328 | 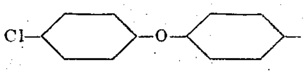 | do | $-C_2H_4-OH$ | do | Do. |
| 329 | 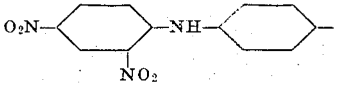 | do | $-C_2H_4-OH$ | do | Red. |
| 330 | 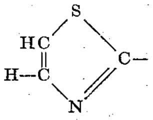 | do | 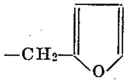 | do | Red. |
| 331 | 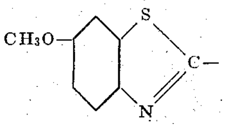 | do | 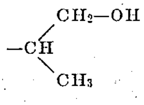 | do | Red. |

—Continued
| Example number | D=Radical of the diazo compound | R | R₁ | K⁺ | Shade of dyeing on polyacrylnitrile fibres |
|---|---|---|---|---|---|
| 332 | 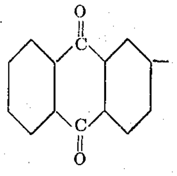 | $-CH_3$ | H | 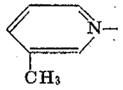 | Red. |
| 333 | 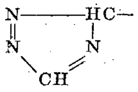 | $-CH_3$ | H | 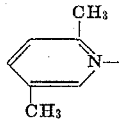 | Yellow. |
| 334 | 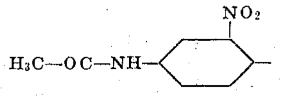 | $-CH_3$ | $-CH_2CH_2OH$ | 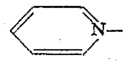 | Red. |
| 335 | 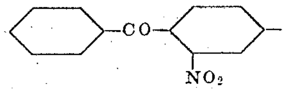 | $-CH_3$ | $-CH_2CH_2OH$ | Same as above | Red. |
| 336 | 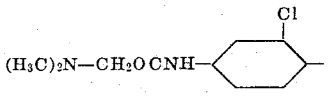 | $-CH_3$ | 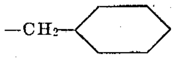 | do | Red. |
| 337 | 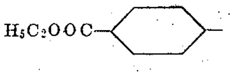 | $-CH_3$ | H | 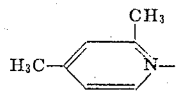 | Yellow. |
| 338 | 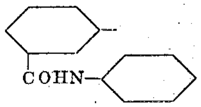 | $-CH_3$ | $-CH_3$ | 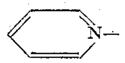 | Do. |
| 339 | 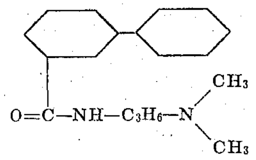 | $-CH_3$ | $-CH_3$ | Same as above | Do. |
| 340 | 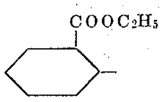 | $-CH_3$ | $-CH_3$ | do | Do. |

—Continued
| Example number | D=Radical of the diazo compound | R | $R_1$ | $K^+$ | Shade of dyeing on polyacrylnitrile fibres |
|---|---|---|---|---|---|
| 341 | 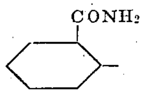 | $-CH_3$ | $-CH_3$ | do | Do. |
| 342 |  | $-CH_3$ | 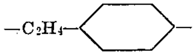 | do | Do. |
| 343 | 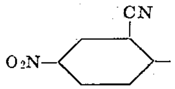 | $-CH_3$ | Same as above | do | Do. |
| 344 | 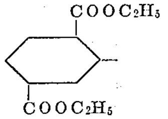 | $-CH_3$ | $-C_2H_5$ | do | Do. |
| 345 | 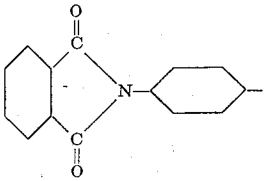 | $-CH_3$ | $-C_2H_4OH$ | do | Red. |
| 346 | 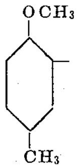 | 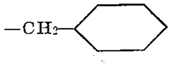 | H | do | Orange. |
| 347 |  | $-CH_3$ | $-CH_2CH-CH_3$<br>OH | do | Red. |
| 348 | 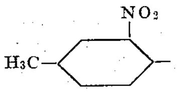 | $-CH_3$ | H | 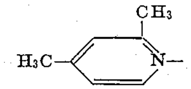 | Yellow. |
| 349 | 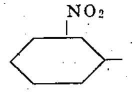 | $-CH_3$ | H | Same as above | Do. |
| 350 | 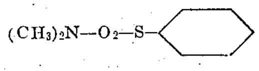 | $-CH_3$ | H | do | Do. |

—Continued
| Example number | D=Radical of the diazo compound | R | $R_1$ | $K^+$ | Shade of dyeing on polyacrylnitrile fibres |
|---|---|---|---|---|---|
| 351 | 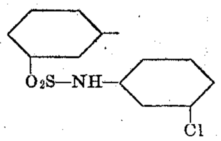 | $-CH_3$ | H | 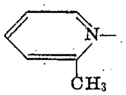 | Do. |
| 352 | 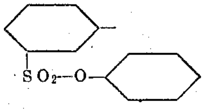 | $-CH_3$ | H | Same as above | Do. |
| 353 | 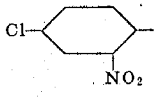 | $-CH_3$ | H | do | Do. |
| 354 | 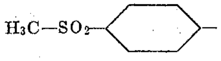 | $-CH_3$ | $-C_2H_4OH$ | 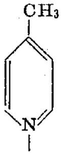 | Do. |
| 355 | 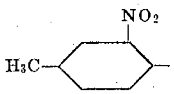 | $-CH_3$ | $-C_2H_4OH$ | 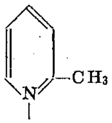 | Do. |
| 356 | 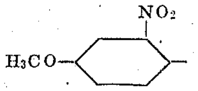 | $-CH_3$ | $-C_2H_4OH$ | 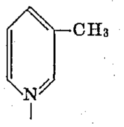 | Orange. |
| 357 | 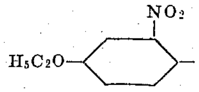 | 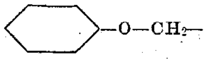 | $-CH_3$ | 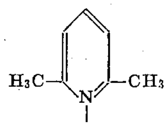 | Do. |
| 358 | 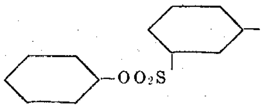 | Same as above | $-(CH_2)_3-CH_3$ | 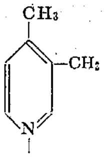 | Yellow. |

–Continued
| Example number | D=Radical of the diazo compound | R | $R_1$ | $K^+$ | Shade of dyeing on polyacrylnitrile fibres |
|---|---|---|---|---|---|
| 359 | 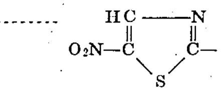 | do. | 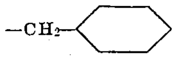 | 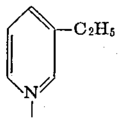 | Red. |
| 360 | 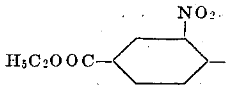 | $-CH_3-$ | 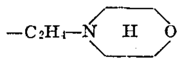 | 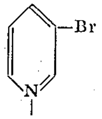 | Red. |
| 361 | 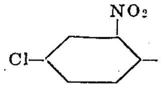 | $-CH_3-$ | H | 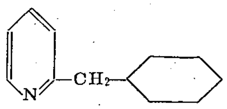 | Yellow. |
| 362 | 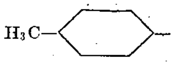 | $-CH_3-$ | H | 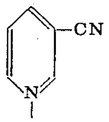 | Do. |
| 363 | 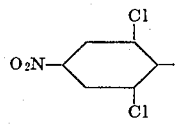 | $-CH_3$ | H | 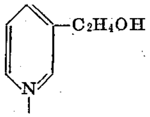 | Do. |
| 364 | 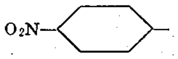 | $-CH_3$ | H | 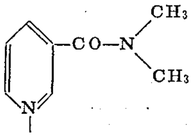 | Do. |
| 365 | 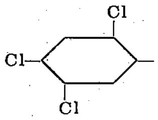 | $-CH_3$ | 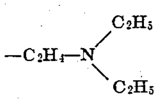 | 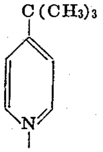 | Do. |
| 366 | 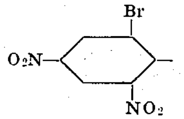 | $-CH_3$ | Same as above | 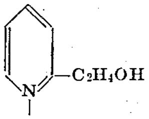 | Do. |

—Continued
| Example number | D=Radical of the diazo compound | R | $R_1$ | $K^+$ | Shade of dyeing on polyacrylnitrile fibres |
|---|---|---|---|---|---|
| 367 | 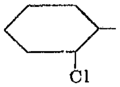 |  | 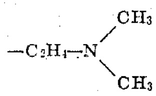 | 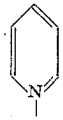 | Do. |
| 368 | 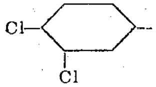 | Same as above | $-N(CH_3)_2$ | Same as above | Do. |
| 369 | 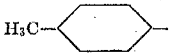 | do | 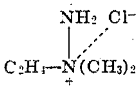 | do | Do. |
| 370 | 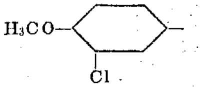 | 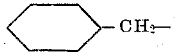 | 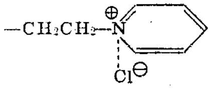 | do | Orange. |
| 371 | 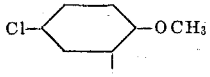 | Same as above | 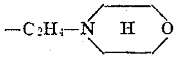 | do | Do. |
| 372 | 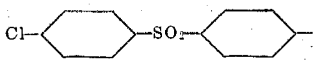 | do | 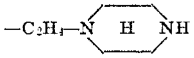 | do | Yellow. |
| 73 | 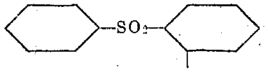 | do | 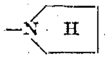 | do | Orange. |
| 374 | 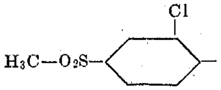 | do | 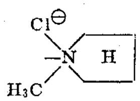 | do | Yellow. |
| 375 | 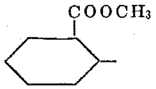 | $-CH_3$ |  | do | Do. |
| 376 | 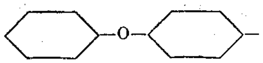 | $-CH_3$ |  | do | Orange. |
| 377 | 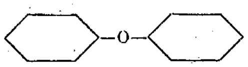 | $-CH_3$ | $-C_2H_4OH$ | do | Yellow. |
| 378 | 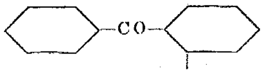 | $-CH_3$ | 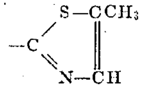 | do | Do |

–Continued
| Example number | D=Radical of the diazo compound | R | $R_1$ | $K^+$ | Shade of dyeing on polyacrylnitrile fibres |
|---|---|---|---|---|---|
| 379 | 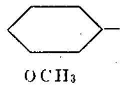 | $-CH_3$ | 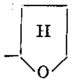 | 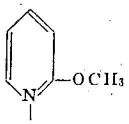 | Do. |
| 380 | 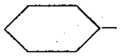 | $-CH_3$ | 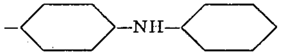 | 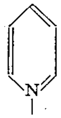 | Do. |
| 381 | 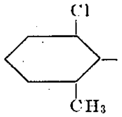 | $-CH_3$ | 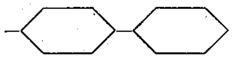 | Same as above | Do. |
| 382 | 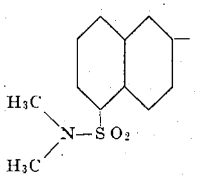 | $-CH_3$ | H | 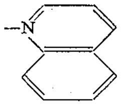 | Red. |
| 383 | 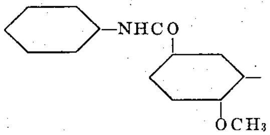 | $-CH_3$ | H | 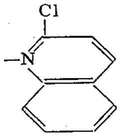 | Red. |
| 384 | 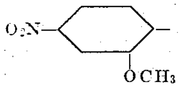 | $-CH_3$ | H | 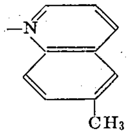 | Orange. |
| 385 | 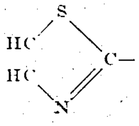 | $-CH_3$ | $-(CH_2)_3-OCH_3$ | 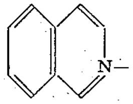 | Red. |
| 386 | 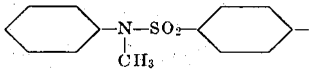 | $-CH_3$ | $-C_2H_4OH$ | 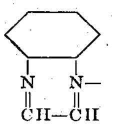 | Yellow. |

—Continued
| Example number | D=Radical of the diazo compound | R | $R_1$ | $K^+$ | Shade of dyeing on polyacrylnitrile fibres |
|---|---|---|---|---|---|
| 387 | 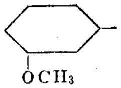 | $-CH_3$ | H | 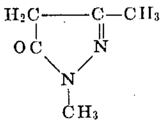 | Do. |
| 388 | 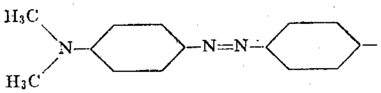 | $-CH_3$ | $-C_2H_4OH$ | 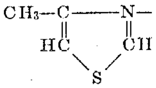 | Orange. |
| 389 | 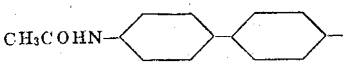 | $-CH_3$ | 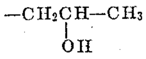 | 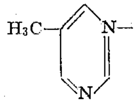 | Red. |
| 390 | 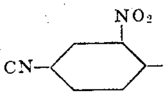 | $CH_3-CH_2-$ | H | 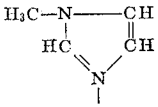 | Red. |
| 391 | 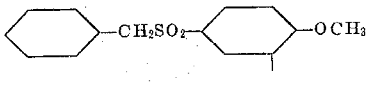 | $CH_3CH_2-$ | H | 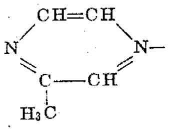 | Orange. |
| 392 | 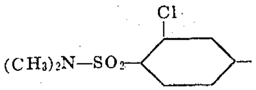 | $CH_3CH_2-$ | H | 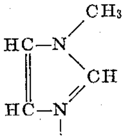 | Yellow. |
| 393 | 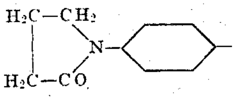 | $CH_3CH_2-$ | H | 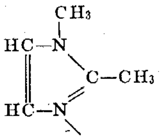 | Orange. |
| 394 | 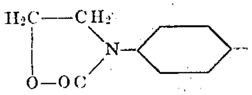 | $CH_3CH_2-$ | H | 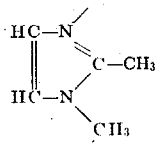 | Do. |

-Continued
| Example number | D = Radical of the diazo compound | R | R1 | K+ | Shade of dyeing on polyacrylnitrile fibres |
|---|---|---|---|---|---|
| 395 | 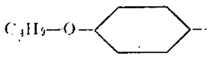 | $-CH_3$ | $-C_2H_4OH$ | 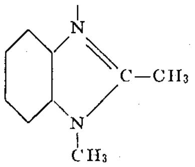 | Do. |
| 396 | 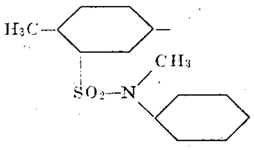 | $-CH_3$ | $-C_2H_4OH$ | 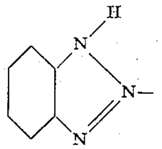 | Yellow. |
| 397 | 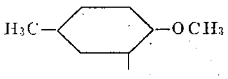 | $-CH_3$ | $-C_2H_4OH$ | 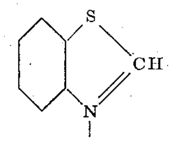 | Orange. |
| 398 | 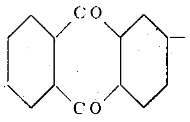 | $-CH_3$ | $-C_2H_4OH$ | 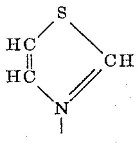 | Do. |
| 399 | 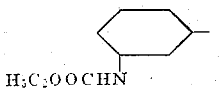 | $-CH_3$ | $-C_2H_4OH$ | 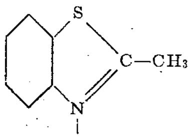 | Yellow. |
| 400 | 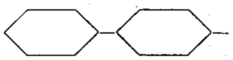 | $-CH_3$ | 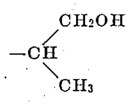 | 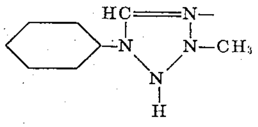 | Orange. |
| 401 | 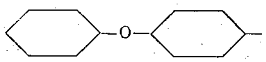 | $-CH_3$ | Same as above | 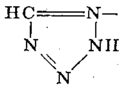 | Do. |
| 402 | 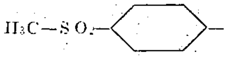 | $-CH_3$ | do | 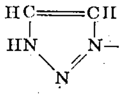 | Yellow. |

—Continued
| Example number | D=Radical of the diazo compound | R | $R_1$ | K+ | Shade of dyeing on polyacrylnitrile fibres |
|---|---|---|---|---|---|
| 403 | 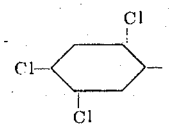 | $-CH_3$ | do | 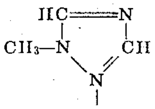 | Do. |
| 404 | 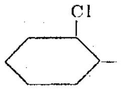 | $-CH_3$ | do | 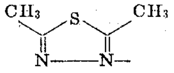 | Do. |
| 405 | 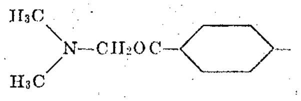 | 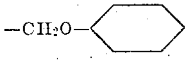 | $-C_2H_4-OH$ | 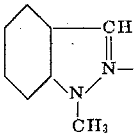 | Do. |
| 406 | 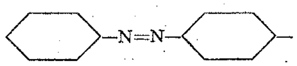 | $-CH_3$ | H | 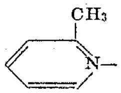 | Orange-red. |
| 407 | 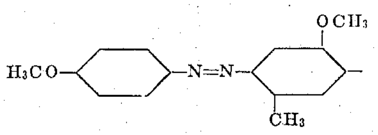 | $-CH_3$ | H | 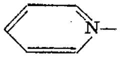 | Blue-red. |
| 408 | 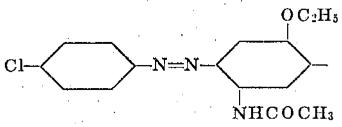 | $-CH_3$ | $-(CH_2)_3-OCH_3$ | Same as above | Do. |
| 409 | 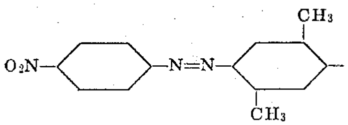 | $-C_2H_5$ | $-(CH_2)_3-OCH_3$ | do | Red-orange. |
| 410 | 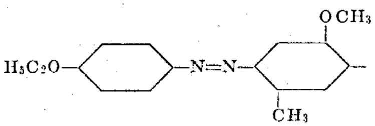 | $CH_3-O-CH_2-$ | $-(CH_2)_2-OH$ | do | Red. |
| 411 | 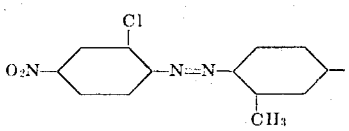 | $-CH_3$ | 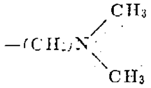 | do | Orange. |

–Continued
| Example number | D=Radical of the diazo compound | R | $R_1$ | $K^+$ | Shade of dyeing on polyacrylnitrile fibres |
|---|---|---|---|---|---|
| 412 | 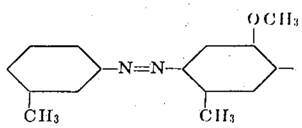 | $-CH_3$ | H | do | Red. |
| 413 | 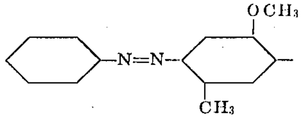 | $-CH_3$ | $-C_2H_4OH$ | 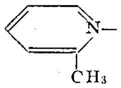 | Do. |
| 414 | 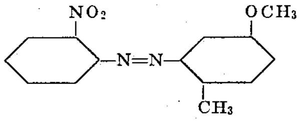 | $-CH_3$ | $-C_2H_4OH$ | 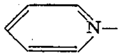 | Red. |
| 415 | 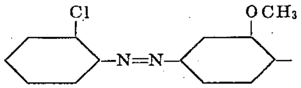 | $-CH_3$ | $-C_2H_4OH$ | Same as above | Red. |
| 416 | 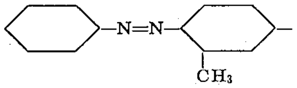 | $-CH_3$ | $-C_2H_4OH$ | do | Orange. |
| 417 | 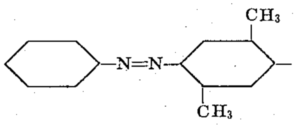 | $-CH_3$ | 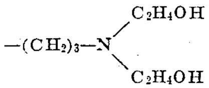 | do | Do. |
| 418 | 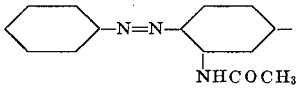 | $-CH_3$ | H | do | Rot. |
| 419 | 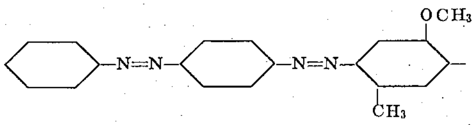 | $-CH_3$ | H | do | Blue-red. |
| 420 | 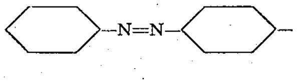 | $-C_2H_5$ | H | 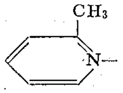 | Orange-red. |

—Continued
| Example number | D=Radical of the diazo compound | R | $R_1$ | $K^+$ | Shade of dyeing on polyacrylnitrile fibres |
|---|---|---|---|---|---|
| 421 | 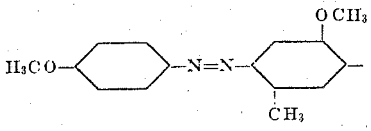 | $-CH_3$ | H | 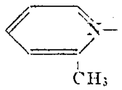 | Blue-red. |
| 422 | 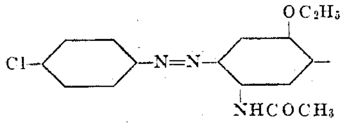 | $-CH_3$ | $-(CH_2)_3-OCH_3$ | Same as above | Do. |
| 423 | 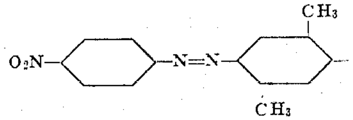 | $CH_3OCH_2-$ | $-(CH_2)_3-OCH_3$ | do | Red-orange. |
| 424 | 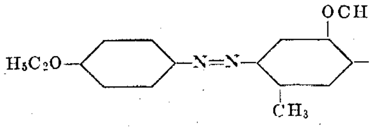 | $C_2H_5OCH_2-$ | $-(CH_2)_3-OH$ | do | Red. |
| 425 | 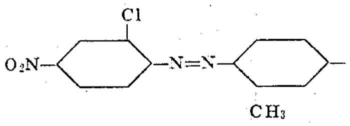 | $-C_2H_5$ | 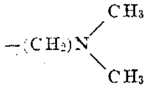 | do | Orange. |
| 426 | 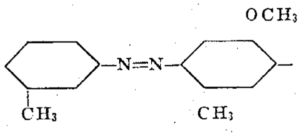 | $-C_2H_5$ | H | do | Red. |
| 427 | 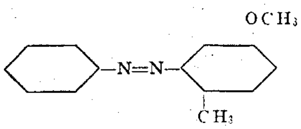 | $-C_2H_5$ | $-C_2H_4OH$ | do | Red. |
| 428 | 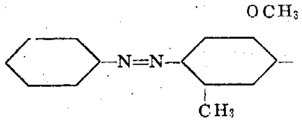 | $-CH_3$ | $-C_2H_4OH$ | do | Red. |

-Continued
| Example number | D = Radical of the diazo compound | R | $R_1$ | $K^+$ | Shade of dyeing on polyacrylnitrile fibres |
|---|---|---|---|---|---|
| 429 | 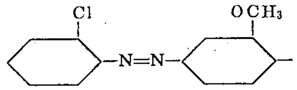 | $-CH_3$ | $-C_2H_4OH$ | do | Red. |
| 430 | 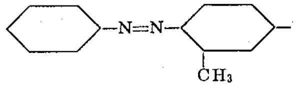 | $-CH_3$ | $-C_2H_4OH$ | do | Orange. |
| 431 | 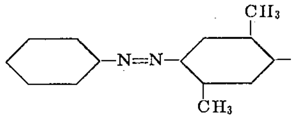 | $-CH_3$ | 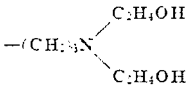 | do | Do. |
| 432 | 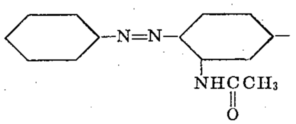 | $-CH_3$ | H | do | Red. |
| 433 | 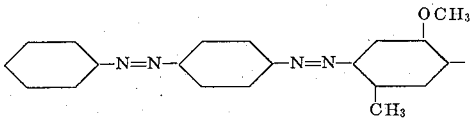 | $-CH_3$ | H | do | Blue-red. |
| 434 | 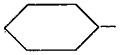 | 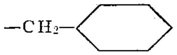 | $-CH_2CH_2-OH$ | 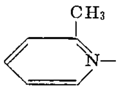 | Yellow. |
| 435 | 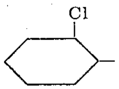 | Same as above | 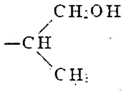 | Same as above | Do. |
| 436 | 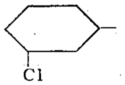 | do | $-CH_2CH_2CH_3$ | do | Do. |
| 437 | 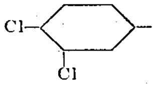 | do | $-(CH_2)_3-OCH_3$ | do | Do. |
| 438 | 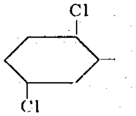 | do | 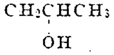 | do | Do. |

–Continued
| Example number | D=Radical of the diazo compound | R | $R_1$ | $K^+$ | Shade of dyeing on polyacrylnitrile fibres |
|---|---|---|---|---|---|
| 439 | 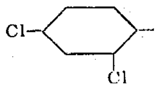 | do | $-(CH_2)_3-OH$ | do | Do. |
| 440 |  | $-CH_3$ | 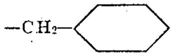 | 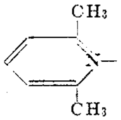 | Do. |
| 441 | 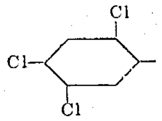 | $-CH_3$ | 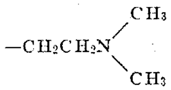 | Same as above | Do. |
| 442 |  | $-CH_3$ | 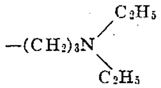 | do | Do. |
| 443 | 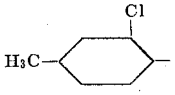 | $-C_2H_5$ | 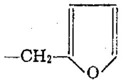 | do | Do. |
| 444 | 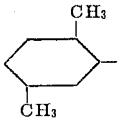 | $-CH_2CH_2CH_3$ | Same as above | do | Do. |
| 445 | 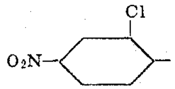 | $-CH_3$ | 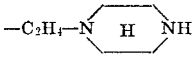 | do | Do. |
| 446 |  | 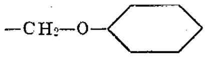 | H | 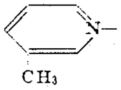 | Do. |
| 447 | 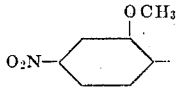 | Same as above | H | 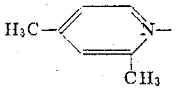 | Do. |
| 448 | 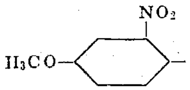 | do | $-C_2H_4OH$ | Same as above | Orange. |

-Continued
| Example number | D=Radical of the diazo compound | R | R₁ | K+ | Shade of dyeing on polyacrylnitrile fibres |
|---|---|---|---|---|---|
| 449 | 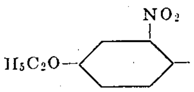 | do | $-C_2H_4OH$ | 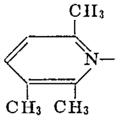 | Do. |
| 450 | 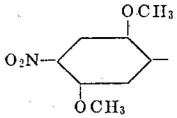 | $-CH_3$ | 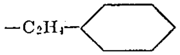 | 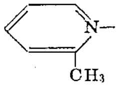 | Red. |
| 451 | 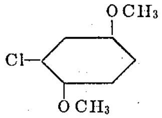 | $-CH_3$ | $CH_3-(CH_2)_3$ | Same as above | Red. |
| 452 | 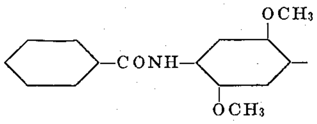 | 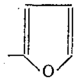 | H | do | Red-blue. |
| 453 | 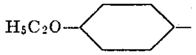 | Same as above | 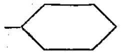 | do | Orange. |
| 454 | Same as above | do | Same as above | 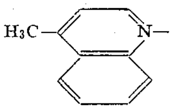 | Red. |
| 455 | 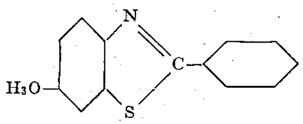 | $-CH_2CH_2CH_3$ | $-(CH_2)_3-O-CH_3$ | 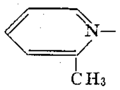 | Orange. |
| 456 | 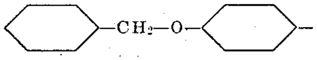 | $-CH_2CH_2CH_3$ | $-(CH_2)_3-O-CH_3$ | Same as above | Do. |
| 457 | 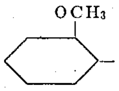 | $-CH_2CH_2CH_3$ | $-(CH_2)_3-O-CH_3$ | do | Yellow. |
| 458 | 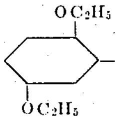 | $-CH_3$ | $-(CH_2)_3-OH$ | 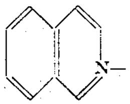 | Red. |

—Continued
| Example number | D=Radical of the diazo compound | R | $R_1$ | $K^+$ | Shade of dyeing on polyacryl-nitrile fibres |
|---|---|---|---|---|---|
| 459 | 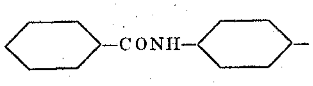 | $-CH_3$ | $-(CH_2)_3-OH$ | 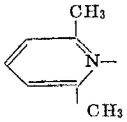 | Orange. |
| 460 | 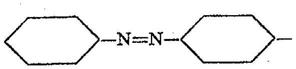 | $-CH_3$ | $-(CH_2)_3-OH$ | 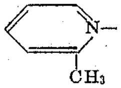 | Red. |
| 461 | 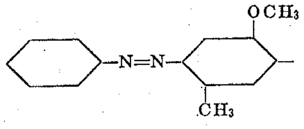 | $-CH_3$ | $-(CH_2)_3-OH$ | Same as above | Red. |
| 462 | 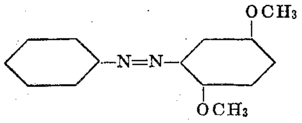 | $-CH_3$ | $-(CH_2)_3-OH$ | do | Blue-red. |
| 463 | 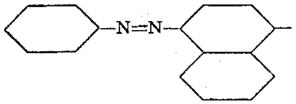 | $-CH_3$ | $-C_2H_4-OH$ | do | Red-blue. |
| 464 | 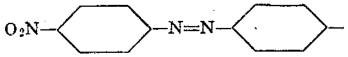 | $-CH_3$ | $-C_2H_4-OH$ | do | Red. |
| 465 | 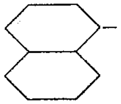 | $-CH_3$ | $-C_2H_4-OH$ | do | Orange. |
| 466 | 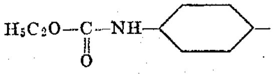 | $-CH_3$ | 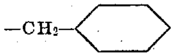 | do | Do. |
| 467 | 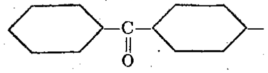 | $-CH_3$ | Same as above | do | Yellow. |
| 468 | 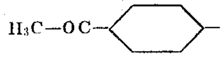 | $-CH_3$ | do | do | Do. |
| 469 | 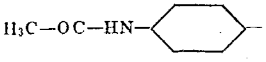 |  | H | do | Orange. |

–Continued
| Example number | D = Radical of the diazo compound | R | $R_1$ | $K^+$ | Shade of dyeing on polyacrylnitrile fibres |
|---|---|---|---|---|---|
| 470 | 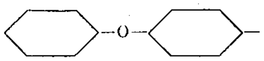 | Same as above | H | do | Yellow. |
| 471 | Same as above | do | H | do | Do. |
| 472 | 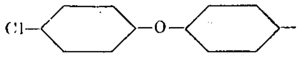 | do | $—C_2H_4—OH$ | do | Do. |
| 473 | 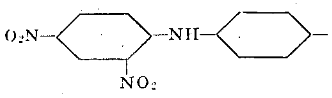 | do | $—C_2H_4—OH$ | do | Red. |
| 474 | 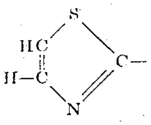 | do | 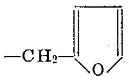 | do | Red. |
| 475 | 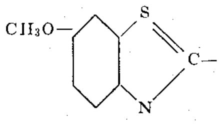 | do | 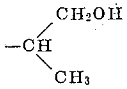 | do | Red. |
| 476 | 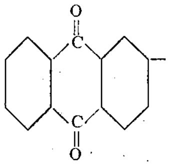 | $—CH_3$ | H | 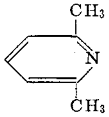 | Red. |
| 477 | 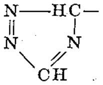 | $—CH_3$ | H | 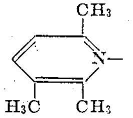 | Yellow. |
| 478 | 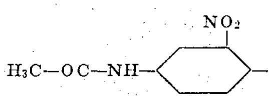 | $—CH_3$ | $—CH_2CH_2OH$ | 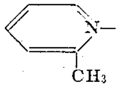 | Red. |
| 479 | 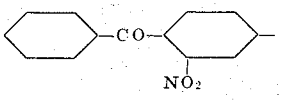 | $—CH_3$ | $—CH_2CH_2OH$ | Same as above | Red. |
| 480 | 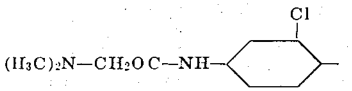 | $—CH_3$ | 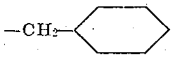 | do | Red. |

—Continued
| Example number | D=Radical of the diazo compound | R | $R_1$ | $K^+$ | Shade of dyeing on polyacrylnitrile fibres |
|---|---|---|---|---|---|
| 481 | 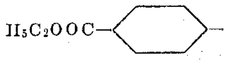 | $-CH_3$ | H |  | Yellow. |
| 482 | 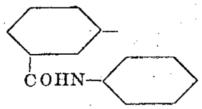 | $-CH_3$ | $-CH_3$ | 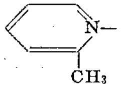 | Do. |
| 483 | 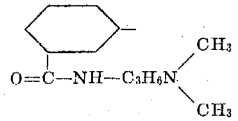 | $-CH_3$ | $-CH_3$ | Same as above | Do. |
| 484 | 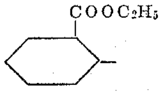 | $-CH_3$ | $-CH_3$ | do | Do. |
| 485 | 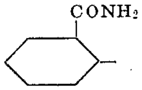 | $-CH_3$ | $-CH_3$ | do | Do. |
| 486 | 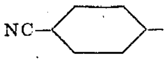 | $-CH_3$ | 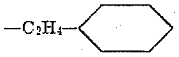 | do | Do. |
| 487 | 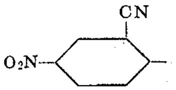 | $-CH_3$ | Same as above | do | Do. |
| 488 | 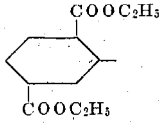 | $-CH_3$ | $-C_2H_5$ | do | Do. |
| 489 | 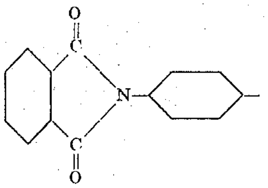 | $-CH_3$ | $-C_2H_4OH$ | do | Red. |

–Continued
| Example number | D=Radical of the diazo compound | R | $R_1$ | $K^+$ | Shade of dyeing on polyacrylnitrile fibres |
|---|---|---|---|---|---|
| 490 | 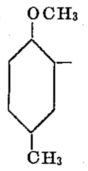 | 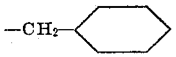 | H | do | Orange. |
| 491 | 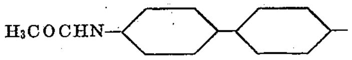 | $-CH_3$ | $-CH_2-\underset{OH}{CH}-CH_3$ | do | Red. |
| 492 | 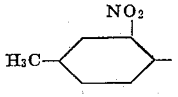 | $-CH_3$ | H | 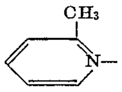 | Yellow. |
| 493 | 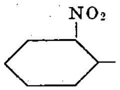 | $-CH_3$ | H | Same as above | Do. |
| 494 | 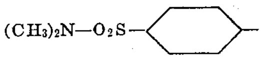 | $-CH_3$ | H | do | Do. |
| 495 | 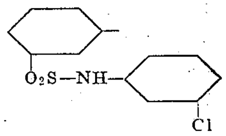 | $-CH_3$ | H | 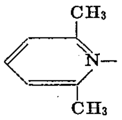 | Do. |
| 496 | 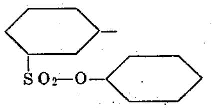 | $-CH_3$ | H | Same as above | Do. |
| 497 | 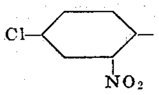 | $-CH_3$ | H | do | Do. |
| 498 | 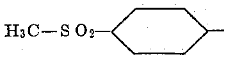 | $-CH_3$ | $-C_2H_4OH$ | 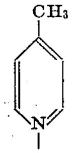 | Do. |

-Continued
| Example number | D=Radical of the diazo compound | R | $R_1$ | $K^+$ | Shade of dyeing on polyacrylnitrile fibres |
|---|---|---|---|---|---|
| 499 | 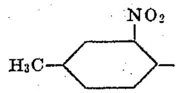 | $-CH_3$ | $-C_2H_4OH$ | 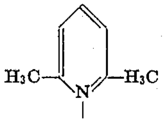 | Do. |
| 500 | 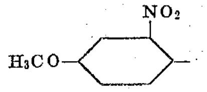 | $-CH_3$ | $-C_2H_4OH$ | Same as above | Orange. |
| 501 | 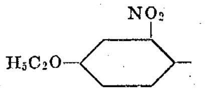 | 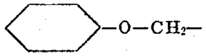 | $-CH_3$ | 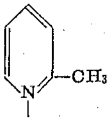 | Do. |
| 502 | 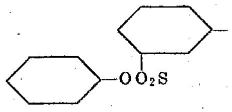 | Same as above | $-(CH_2)_3-CH_3$ | 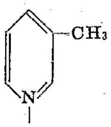 | Yellow. |
| 503 | 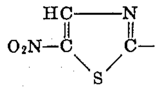 | $-CH_3$ | 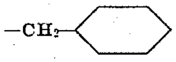 | 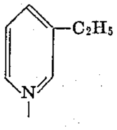 | Red. |
| 504 | 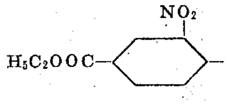 | $-C_2H_5$ | 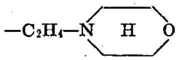 | 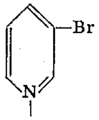 | Red. |
| 505 | 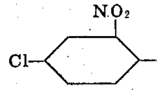 | 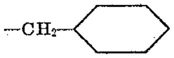 | H | 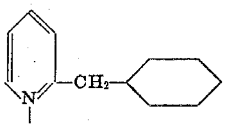 | Yellow. |
| 506 |  | Same as above | H | 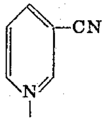 | Do. |
| 507 | 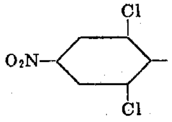 | do | H | 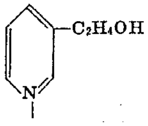 | Do. |

—Continued
| Example number | D=Radical of the diazo compound | R | R₁ | K⁺ | Shade of dyeing on polyacrylnitrile fibres |
|---|---|---|---|---|---|
| 508 | 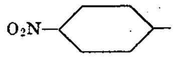 | do | H | 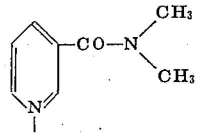 | Do. |
| 509 | 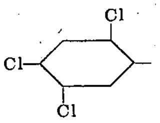 | $-C_2H_5$ | 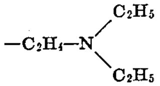 | 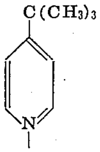 | Do. |
| 510 | 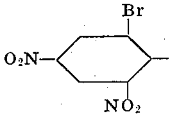 | $-C_2H_5$ | Same as above | 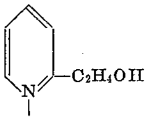 | Do. |
| 511 | 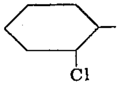 | 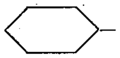 | 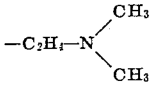 | 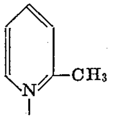 | Do. |
| 512 | 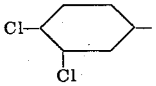 | Same as above | $-N(CH_3)_2$ | Same as above | Do. |
| 513 | 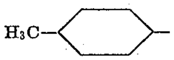 | do | 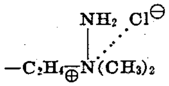 | do | Do. |
| 514 | 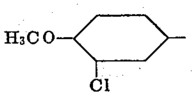 | 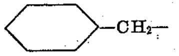 | 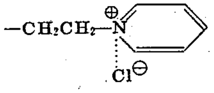 | do | Orange. |
| 515 | 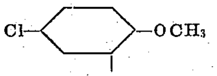 | Same as above | 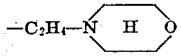 | do | Do. |
| 516 | 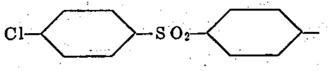 | do | 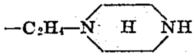 | do | Yellow. |
| 517 | 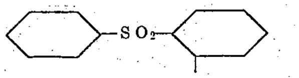 | do | 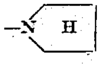 | do | Orange. |

—Continued
| Example number | D=Radical of the diazo compound | R | $R_1$ | $K^+$ | Shade of dyeing on polyacrylnitrile fibres |
|---|---|---|---|---|---|
| 518 | 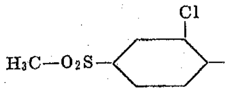 | do | 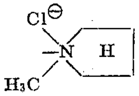 | do | Yellow. |
| 519 | 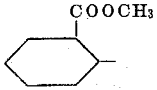 | $-CH_3$ |  | do | Do. |
| 520 | 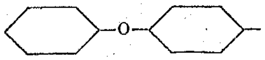 | $-CH_3$ |  | do | Orange. |
| 521 | 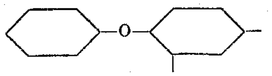 | $-CH_3$ | $-C_2H_4OH$ | do | Yellow. |
| 522 | 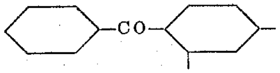 | $-CH_3$ | 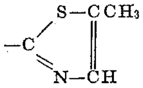 | do | Do. |
| 523 | 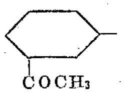 | $CO_3-OCH_2-$ | 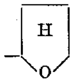 | 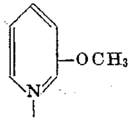 | Do. |
| 524 |  | $CH_3-OCH_2-$ | 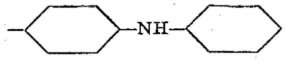 | 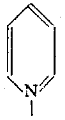 | Do. |
| 525 | 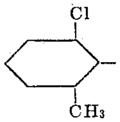 | $-CH_3$ | 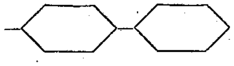 | 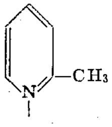 | Do. |
| 526 | 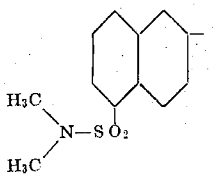 | $-CH_3$ | $-CH_3$ | 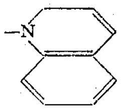 | Red. |

—Continued
| Example number | D=Radical of the diazo compound | R | $R_1$ | K+ | Shade of dyeing on polyacrylnitrile fibres |
|---|---|---|---|---|---|
| 527 | 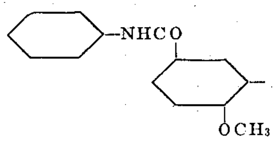 | $-CH_3$ | $-CH_3$ | 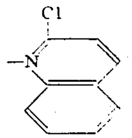 | Red. |
| 528 | 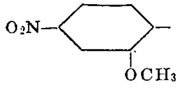 | $-CH_3$ | $-CH_3$ | 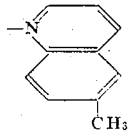 | Orange. |
| 529 | 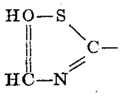 | $-C_2H_5$ | $-(CH_2)_3-OCH_3$ | 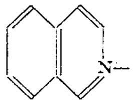 | Red. |
| 530 | 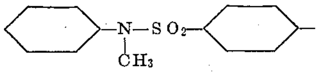 | $-C_2H_5$ | $-C_2H_4OH$ | 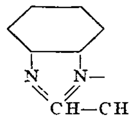 | Yellow. |
| 531 | 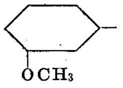 | $-C_2H_5$ | H | 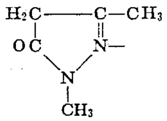 | Do. |
| 532 | 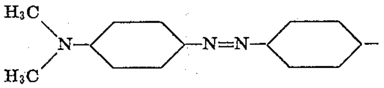 | $-C_2H_5$ | $-C_2H_4OH$ | 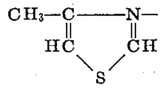 | Orange. |
| 533 | 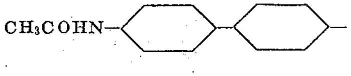 | $-C_2H_5$ | $-CH_2-CH(OH)-CH_3$ | 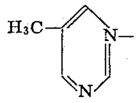 | Red. |
| 534 | 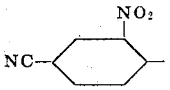 | $CH_3CH_2CH_2$ | H | 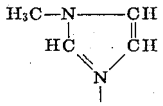 | Yellow. |
| 535 | 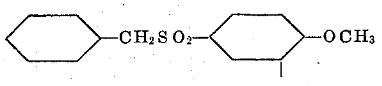 | $CH_3CH_2CH_2$ | H | 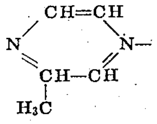 | Orange. |

—Continued
| Example number | D=Radical of the diazo compound | R | $R_1$ | $K^+$ | Shade of dyeing on polyacrylnitrile fibres |
|---|---|---|---|---|---|
| 536 | 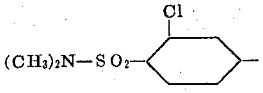 | $CH_3CH_2CH_2$ | H | 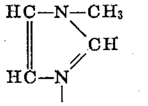 | Yellow. |
| 537 | 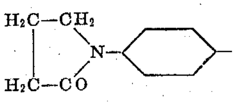 | $CH_3CH_2CH_2$ | H | 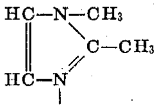 | Orange. |
| 538 | 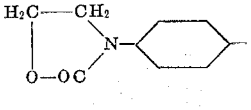 | $CH_3CH_2CH_2$ | H | 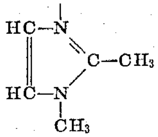 | Do. |
| 539 | 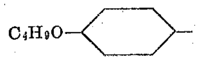 | $-C_2H_5$ | $-C_2H_4OH$ | 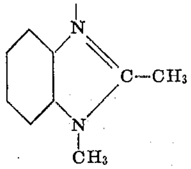 | Do. |
| 540 | 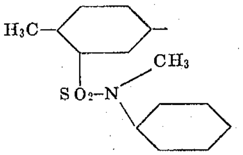 | $-C_2H_5$ | $-C_2H_4OH$ | 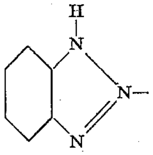 | Yellow. |
| 541 |  | $-C_2H_5$ | $-C_2H_4OH$ | 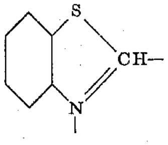 | Orange. |
| 542 | 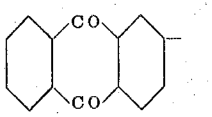 | $-C_2H_5$ | $-C_2H_4OH$ | 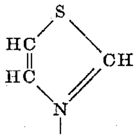 | Do. |
| 543 | 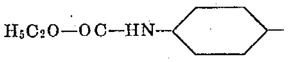 | $-C_2H_5$ | $-C_2H_4OH$ | 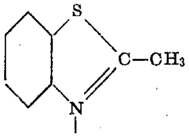 | Yellow. |

–Continued
| Example number | D=Radical of the diazo compound | R | $R_1$ | K+ | Shade of dyeing on polyacrylnitrile fibres |
|---|---|---|---|---|---|
| 544 | 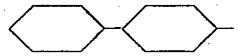 | $-C_2H_5$ | 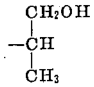 | 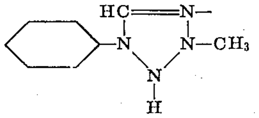 | Orange. |
| 545 | 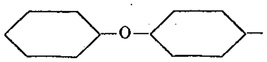 | $-C_2H_5$ | Same as above | 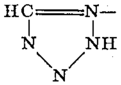 | Do. |
| 546 | 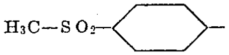 | $-C_2H_5$ | do | 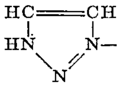 | Yellow. |
| 547 | 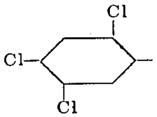 | $-C_2H_5$ | do | 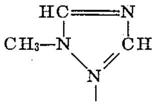 | Do. |
| 548 | 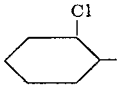 | $-C_2H_5$ | do | 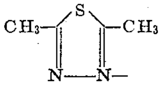 | Do. |
| 549 | 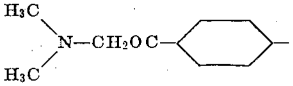 | 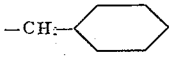 | $-C_2H_4OH$ | 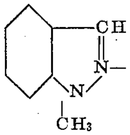 | Do. |
| 550 | 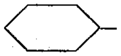 | 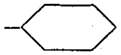 | H | 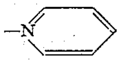 | Do. |
| 551 | 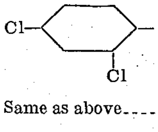 | $-CH_3$ | H | Same as above | Do. |
| 552 | Same as above | $-CH_3$ | 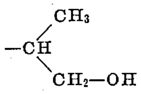 | do | Do. |
| 553 | 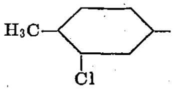 | $-CH_3$ | $-CH_3$ | 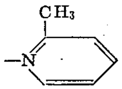 | Do. |

—Continued
| Example number | D=Radical of the diazo compound | R | $R_1$ | $K^+$ | Shade of dyeing on polyacrylnitrile fibres |
|---|---|---|---|---|---|
| 554 | 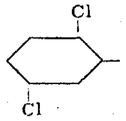 | $-CH_3$ | H | 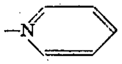 | Do. |
| 555 | Same as above | $-CH_3$ | H | 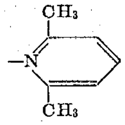 | Do. |
| 556 | do | $-CH_3$ | $-CH_3$ | 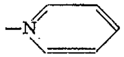 | Do. |
| 557 | do | $-CH_3$ | H | 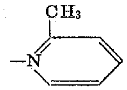 | Do. |
| 558 | 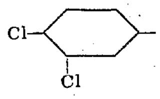 | $-CH_3$ | H | 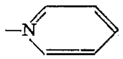 | Do. |
| 559 | 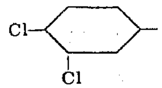 | $-CH_3$ | H | 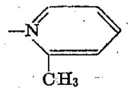 | Do. |
| 560 | 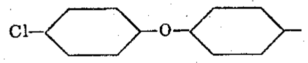 | $-CH_3$ | H | 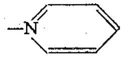 | Do. |
| 561 | Same as above | $-CH_3$ | H | 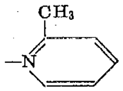 | Do. |
| 562 | do | $-CH_3$ | $-C_2H_4-OH$ | 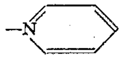 | Do. |
| 563 | 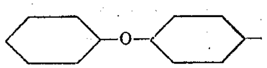 | $-CH_3$ | H | Same as above | Do. |
| 564 | Same as above | $-CH_3$ | $-(CH_2)_3-OCH_3$ | do | Do. |
| 565 | 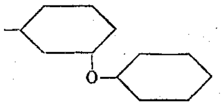 | $-CH_3$ | H | do | Do. |

—Continued
| Example number | D=Radical of the diazo compound | R | $R_1$ | $K^+$ | Shade of dyeing on polyacrylnitrile fibres |
|---|---|---|---|---|---|
| 566 | 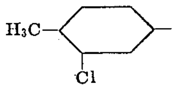 | $-CH_3$ | H | 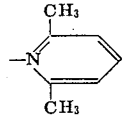 | Do. |
| 567 | 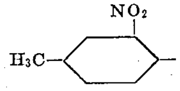 | $-CH_3$ | H | Same as above | Do. |
| 568 | Same as above | 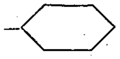 | H | 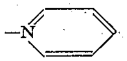 | Do. |
| 569 | 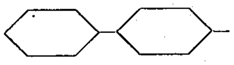 | $-CH_3$ | H | Same as above | Yellow. |
| 570 | Same as above | $-CH_3$ | H | 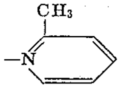 | Do. |
| 571 | 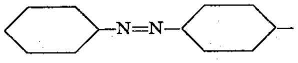 | $-CH_3$ | H | 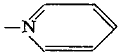 | Orange. |
| 572 | Same as above | $-CH_3$ | $-C_2H_4OH$ | Same as above | Do. |
| 573 | do | $-CH_3$ | H | 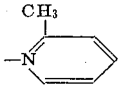 | Do. |
| 574 | 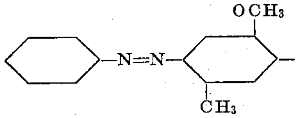 | $-CH_3$ | H | 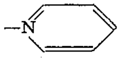 | Red. |
| 575 | Same as above | $-CH_3$ | H | 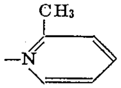 | Red. |
| 576 | do | $-CH_3$ | H | 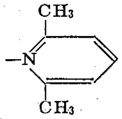 | Red. |

Formulae of representative dyes of the foregoing Examples are as follows:
| | | |
|---|---|---|
| Example 1 | 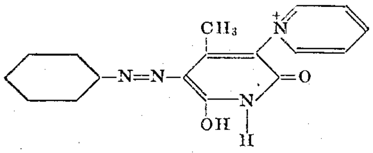 | $Cl^-$ |
| Example 2 | 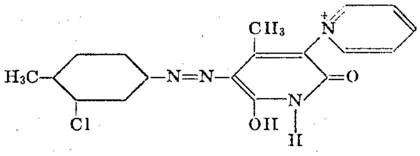 | $Cl^-$ |
| Example 492 | 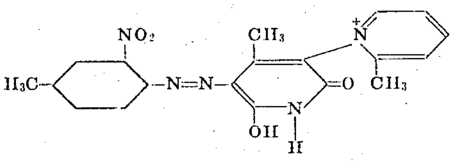 | $Cl^-$ |
| Example 550 | 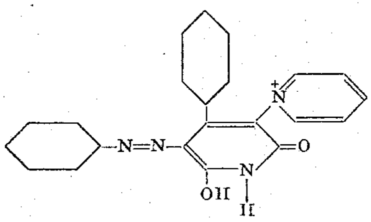 | $Cl^-$ |
| Example 551 | 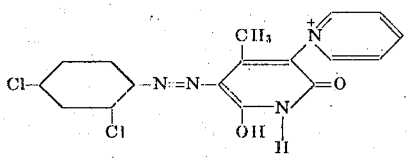 | $Cl^-$ |
| Example 552 | 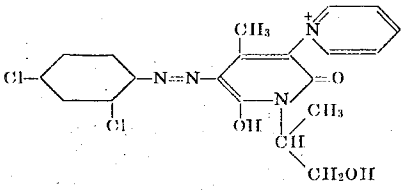 | $Cl^-$ |
| Example 553 | 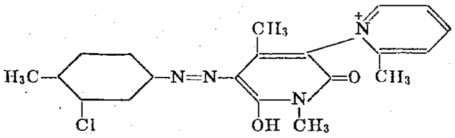 | $Cl^-$ |
| Example 554 | 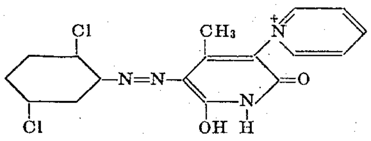 | $Cl^-$ |
| Example 555 | 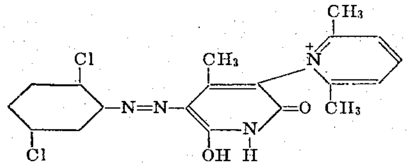 | $Cl^-$ |
| Example 556 | 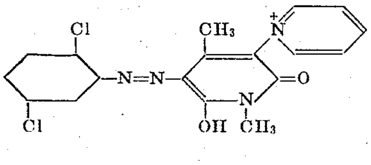 | $Cl^-$ |

Example 557
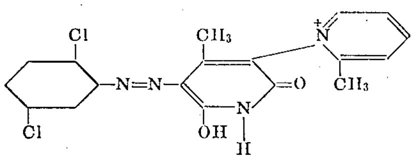
$Cl^-$
Example 558
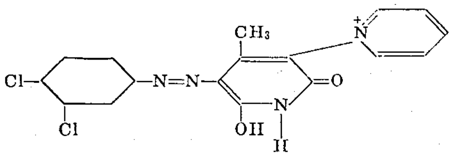
$Cl^-$
Example 559
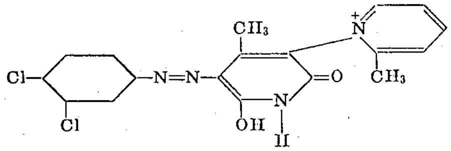
$Cl^-$
Example 560
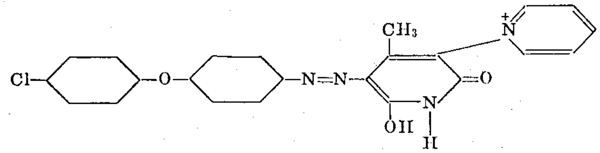
$Cl^-$
Example 561
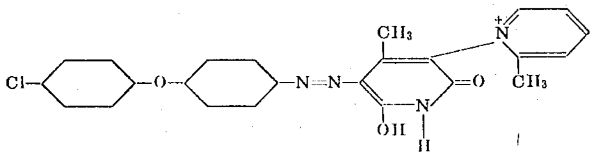
$Cl^-$
Example 562
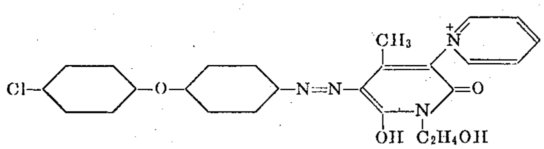
$Cl^-$
Example 563
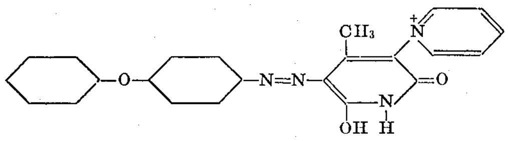
$Cl^-$
Example 564
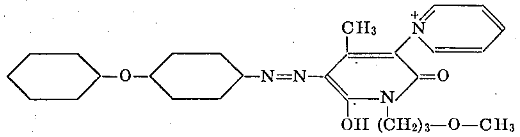
$Cl^-$
Example 565
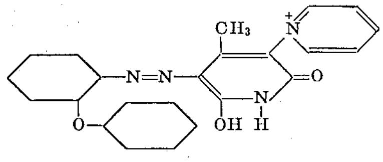
$Cl^-$
Example 566
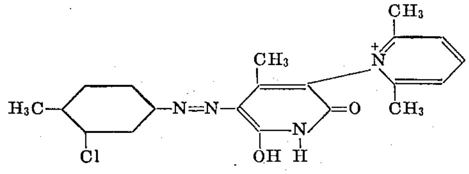
$Cl^-$
Example 567
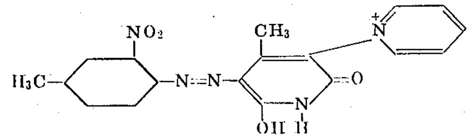
$Cl^-$ Example 568

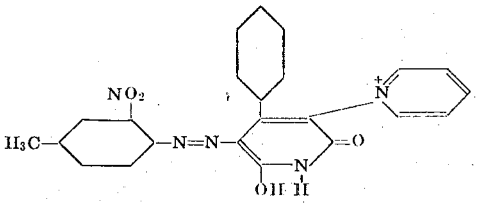

$Cl^-$

Example 569

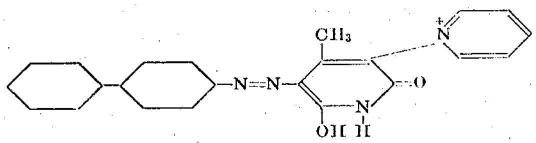

$Cl^-$

Example 570

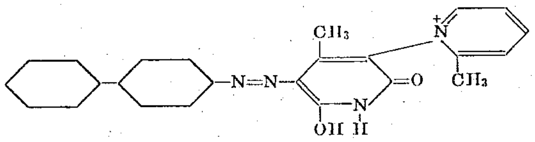

$Cl^-$

Example 571

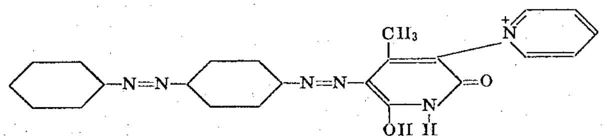

$Cl^-$

Example 572

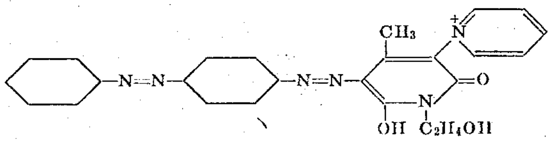

$Cl^-$

Example 573

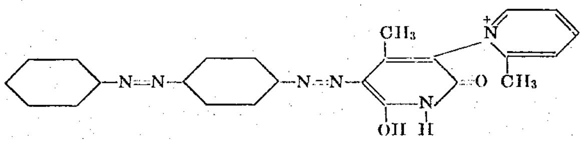

$Cl^-$

Example 574

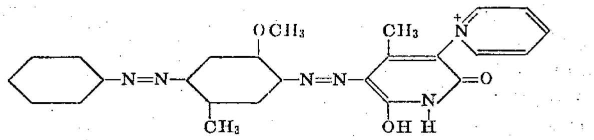

$Cl^-$

Example 575

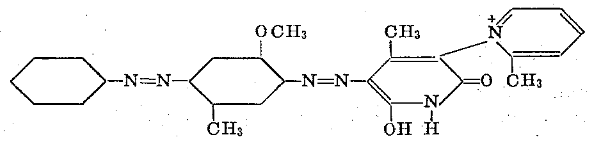

$Cl^-$

Example 576

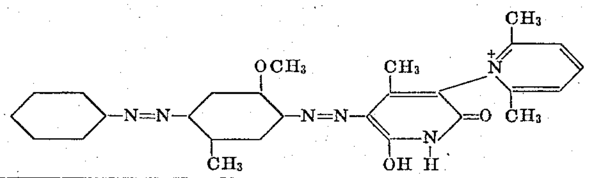

$Cl^-$

Having thus disclosed the invention what we claim is:

1. A compound of the formula

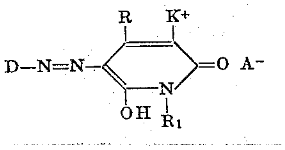

(I), wherein

D is phenyl, naphthyl, anthraquinonyl, 2-thiazolyl, 2-benzothiazolyl or 1,2,4-triazolyl, or a substituted derivative thereof, wherein each substitutent of each substituted derivative is independently lower alkyl, lower alkoxy, halo, nitro, cyano, trifluoromethyl, phenyl, lower alkanamidophenyl, phenoxy, chlorophenoxy, benzyloxy, anilino, nitroanilino, dinitroanilino, lower alkanoyl, benzoyl, lower alkylbenzoyl, carbamoyl, dilower alkylcarbamoyl, phenylcarbamoyl, N-(dilower alkylamino lower alkyl)carbamoyl, lower alkoxycarbonyl, dilower alkylaminolower alkanoyl, lower alkanamido, dilower alkylaminolower alkanamido, lower alkoxycarbonylamino, benzamido, lower alkylsulfonyl, phenylsulfonyl, chlorophenylsulfonyl, benzylsulfonyl, phenoxysulfonyl, sulfamoyl, lower alkylsulfamoyl, dilower alkylsulfamoyl, phenylsulfamoyl, chlorophenylsulfamoyl, N-phenyl-N-lower alkylsulfamoyl, naphthylsulfamoyl, N-(dilower alkylaminolower alkyl) carbamoylphenyl, phenylazo, nitrophenylazo, chlorophenylazo, chloronitrophenylazo, lower alkylphenylazo, lower alkoxyphenylazo, dilower alkylaminophenylazo, lower alkanamidophenylazo, phenylazophenylazo, phthalimido, 2-oxopyrrolidinyl-1, 2-oxo-1,3-oxazolidinyl-1 or 6-lower alkylbenzothiazolyl-2;

$K^+$ is pyridinium, quinolinium, isoquinolinium, quinoxalinium, thiazolium, pyrimidinium, imidazolium, pyrazinium, benzoimidazolium, benzotriazolium, benzothiazolium, triazolium, tetrazolium, thiadiazolium, indazolium, or 3-oxopyrazolinium, or a substituted derivative thereof, wherein each substitutent of each substituted derivative is independently lower alkyl, lower alkoxy, chloro, bromo, cyano, lower hydroxyalkyl, benzyl, phenyl or dilower alkylcarbamoyl;

R is hydrogen, lower alkyl, monosubstituted lower alkyl, phenyl, furyl, pyridyl, lower alkoxycarbonyl or

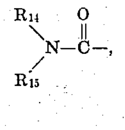

wherein the substituent of monosubstituted lower alkyl is lower alkoxy, lower alkoxycarbonyl, lower alkylsulfonyl, cyano, phenoxy, phenyl, dilower alkylcarbamoyl, phenylcarbamoyl or pyrrolidinocarbonyl, and each of $R_{14}$ and $R_{15}$ is independently hydrogen, alkyl of 1 to 6 carbon atoms, monosubstituted lower alkyl, phenyl, tolyl or lower alkoxy, wherein the substituent of monosubstituted lower alkyl is hydroxy, phenyl, lower alkoxycarbonyl, lower alkoxy, cyano, morpholino, piperazino, tetrahydrofuryl or dilower alkylamino, or $R_{14}$ and $R_{15}$ taken together and with the nitrogen to which they are bound are pyrrolidino, piperidino, N'-lower hydroxyalkylpiperazino, hydrazino, N'-lower hydroxyalkylhydrazino or N',N'-dilower hydroxyalkylhydrazino;

$R_1$ is hydrogen, alkyl of 1 to 8 carbon atoms, monosubstituted lower alkyl, phenyl, chlorophenyl, tolyl, N,N-dimethylaminophenyl, anilinophenyl, diphenyl, lower alkylcarbamoyl, amino, dilower alkylamino, lower hydroxyalkylamino, pyrrolidino, morpholino, N-lower alkylpiperazino, pyridyl, tetrahydrofuryl, lower alkylthiazolyl or N-lower alkylpyrrolidinium $^+A^-$, wherein the substituent of monosubstituted lower alkyl is lower alkoxy, hydroxy, dilower alkylamino, lower hydroxyalkylamino, dilower hydroxyalkylamino, cyano, phenyl, lower alkoxycarbonyl, piperazino, N-lower alkylpiperazino, morpholino, pyridinium $^+A^-$ or N,N-dilower alkylhydrazinium $^+A^-$, and $A^-$ is an anion.

2. A compound according to claim 1 wherein

D is phenyl or naphthyl, or a substituted derivative thereof having 1 to 3 substituents, wherein each substituent is independently lower alkyl, lower alkoxy, chloro, bromo, nitro, cyano, phenyl, 4-acetamidophenyl, phenoxy, 4-chlorophenoxy, benzyloxy, anilino, nitroanilino, 2,4-dinitroanilino acetyl, benzoyl, 4-methylbenzoyl, carbamoyl, dimethylcarbamoyl, phenylcarbamoyl, 3-(N,N-dimethylamino)propylcarbamoyl, lower alkoxycarbonyl, acetamido, N,N-dimethylaminoacetamido, lower alkoxycarbonylamino, benzamido, lower alkylsulfonyl, phenylsulfonyl, 4-chlorophenylsulfonyl, benzylsulfonyl, phenoxysulfonyl, lower alkylsulfamoyl, dilower alkylsulfamoyl, phenylsulfamoyl, 3-chlorophenylsulfamoyl, N-phenyl-N-lower alkylsulfamoyl, naphthylsulfamoyl, phenylazo, nitrophenylazo, 4-chlorophenylazo, tolylazo, lower alkoxyphenylazo, 4-phenylazophenylazo, 2-oxopyrrolidinyl-1, 2-oxo-1,3-oxazolidinyl-1 or phthalimido, $K^+$ is pyridinium, quinolinium or isoquinolinium, or a substituted derivative thereof, wherein each substituted derivative has 1 to 3 substituents and each substituent of each substituted derivative is independently lower alkyl, methoxy, 2-hydroxyethyl, chloro, bromo, cyano, benzyl or N,N-dimethylcarbamoyl, R is hydrogen, lower alkyl, phenyl, benzyl, lower alkoxymethyl, phenoxymethyl, lower alkoxycarbonyl or

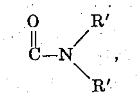

wherein each R' is independently hydrogen, alkyl of 1 to 6 carbon atoms, lower hydroxyalkyl, phenyl, o-tolyl or phenyl lower alkyl, and $R_1$ is hydrogen, lower alkyl, lower hydroxyalkyl, methoxy lower alkyl, phenyl or phenyl lower alkyl.

3. A compound according to claim 2 wherein $K^+$ is pyridinium or substituted pyridinium having 1 or 2 substituents wherein each substituent is independently methyl or ethyl, R is hydrogen, lower alkyl or phenyl, and $R_1$ is hydrogen, lower alkyl, lower hydroxyalkyl or 3-methoxypropyl.

4. A compound according to claim 3 wherein

D is phenyl or substituted phenyl having 1 to 3 substituents, wherein each substituent is independently methyl, methoxy, chloro, nitro, phenoxy, 4-chlorophenoxy, phenyl or phenylazo, $K^+$ is pyridinium, methylpyridinium or dimethylpyridinium, R is methyl or phenyl, $R_1$ is hydrogen, methyl, 1-hydroxypropyl-2, 2-hydroxyethyl or 3-methoxypropyl, and $A^-$ is $Cl^-$.

5. A compound according to claim 1 wherein $K^+$ is pyridinium.

6. The compound according to claim 4 having the formula

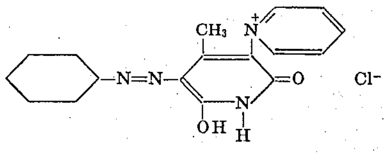

7. The compound according to claim 4 having the formula

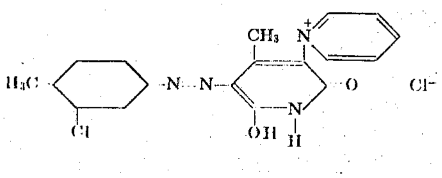

8. The compound according to claim 4 having the formula

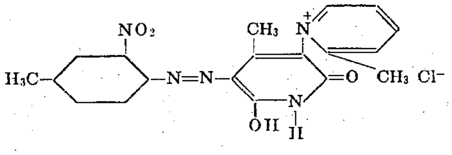

9. The compound according to claim 4 having the formula

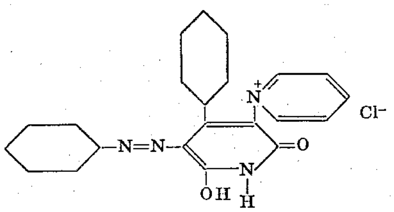

10. The compound according to claim 4 having the formula

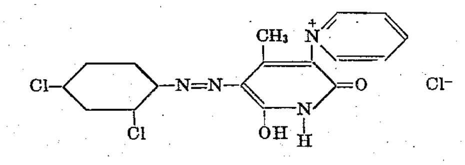

11. The compound according to claim 4 having the formula

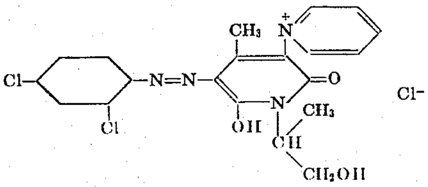

12. The compound according to claim 4 having the formula

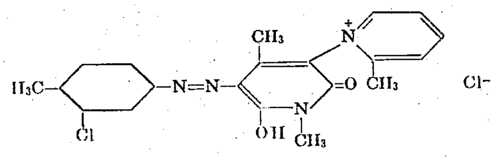

13. The compound according to claim 4 having the formula

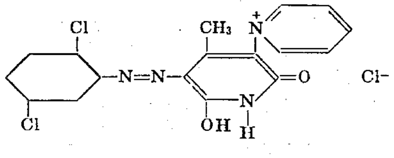

14. The compound according to claim 4 having the formula

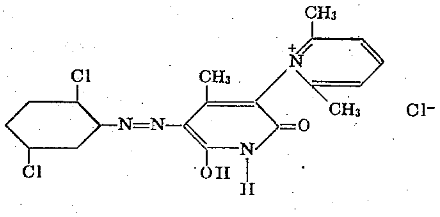

15. The compound according to claim 4 having the formula

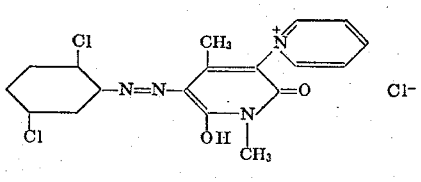

16. The compound according to claim 4 having the formula

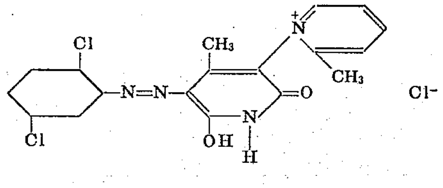

17. The compound according to claim 4 having the formula

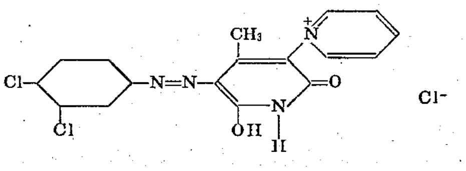

18. The compound according to claim 4 having the formula

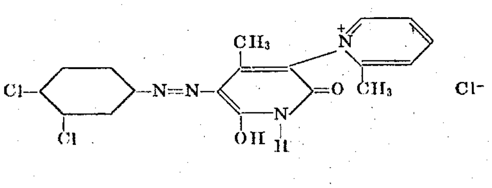

19. The compound according to claim 4 having the formula

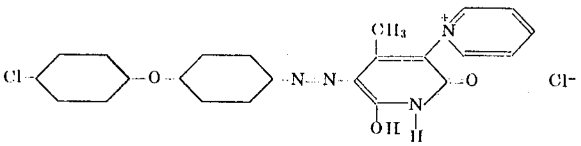

20. The compound according to claim 4 having the formula

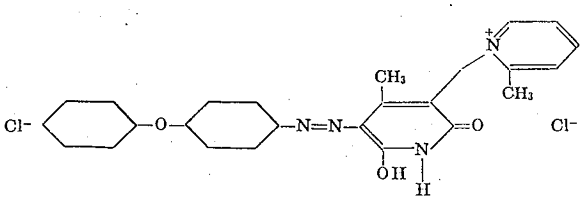

21. The compound according to claim 4 having the formula

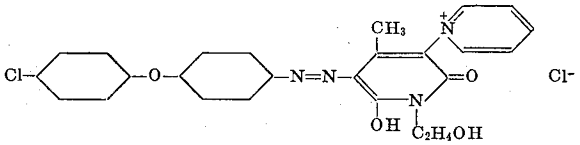

22. The compound according to claim 4 having the formula

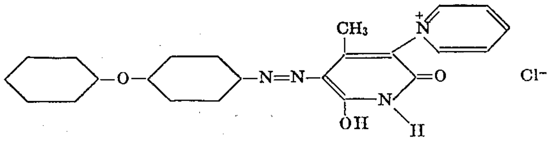

23. The compound according to claim 4 having the formula

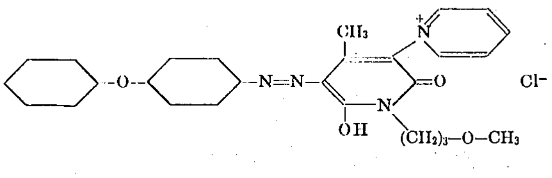

24. The compound according to claim 4 having the formula

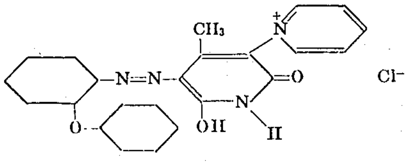

25. The compound according to claim 4 having the formula

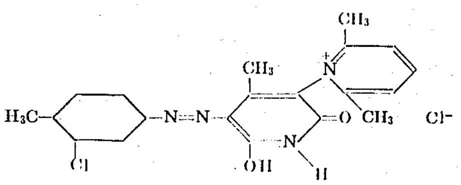

26. The compound according to claim 4 having the formula

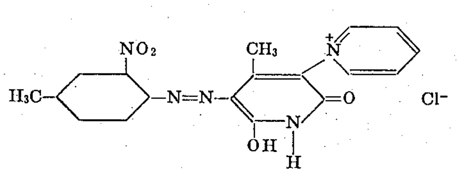

27. The compound according to claim 4 having the formula

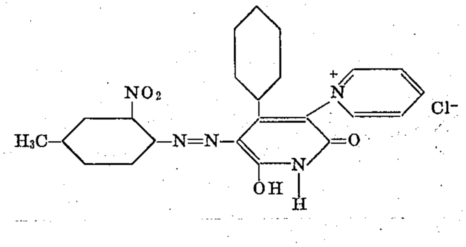

28. The compound according to claim 4 having the formula

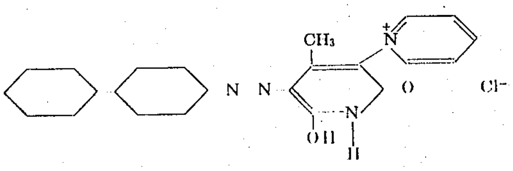

29. The compound according to claim 4 having the formula

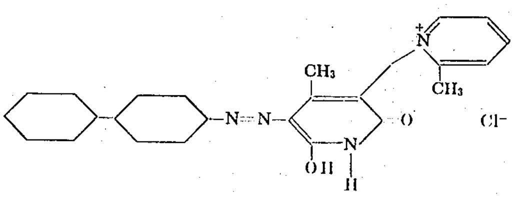

30. The compound according to claim 4 having the formula
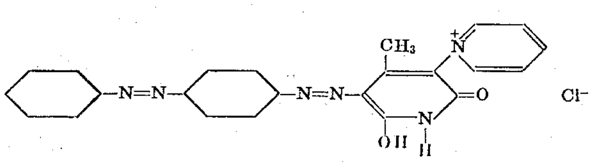
31. The compound according to claim 4 having the formula
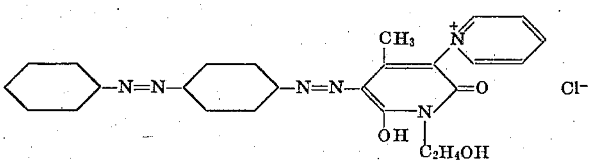
32. The compound according to claim 4 having the formula
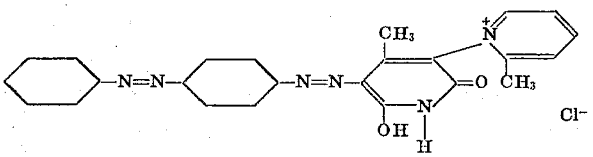
33. The compound according to claim 4 having the formula
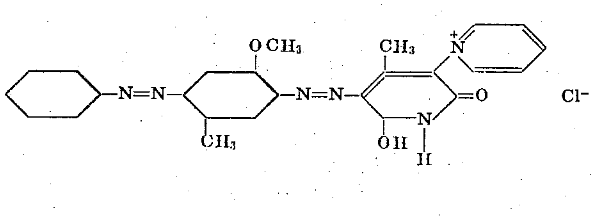
34. The compound according to claim 4 having the formula
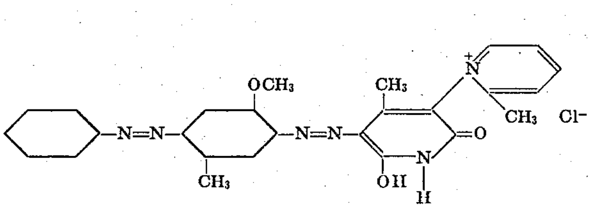
35. The compound according to claim 4 having the formula
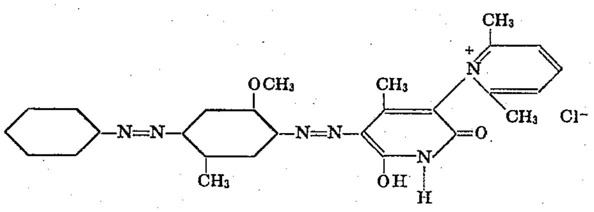
* * * * *

UNITED STATES PATENT OFFICE

CERTIFICATE OF CORRECTION

Patent No. 3,852,261 Dated Dec. 3, 1974

Inventor(s) Willy Steinemann

It is certified that error appears in the above-identified patent and that said Letters Patent are hereby corrected as shown below:

Title page, line 1 under Foreign Application Priority Data, delete "Dec. 7, 1969" and insert therefor -- Nov. 7, 1969 --.

Title page, between items [21] and [30] insert -- [22] Filed: Nov. 6, 1970 --.

Signed and Sealed this

Sixth Day of July 1976

[SEAL]

*Attest:*

RUTH C. MASON
*Attesting Officer*

C. MARSHALL DANN
*Commissioner of Patents and Trademarks*